(12) United States Patent
Wang

(10) Patent No.: US 12,732,572 B2
(45) Date of Patent: Sep. 8, 2026

(54) ELECTRONIC DEVICE

(71) Applicant: Honor Device Co., Ltd., Shenzhen (CN)

(72) Inventor: Xuyang Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 332 days.

(21) Appl. No.: 18/552,301

(22) PCT Filed: May 6, 2023

(86) PCT No.: PCT/CN2023/092538
§ 371 (c)(1),
(2) Date: Sep. 25, 2023

(87) PCT Pub. No.: WO2023/246334
PCT Pub. Date: Dec. 28, 2023

(65) Prior Publication Data

US 2025/0088578 A1 Mar. 13, 2025

(30) Foreign Application Priority Data

Jun. 23, 2022 (CN) ......................... 202210714656.4

(51) Int. Cl.
*H04M 1/02* (2006.01)

(52) U.S. Cl.
CPC ................................. *H04M 1/0262* (2013.01)

(58) Field of Classification Search
CPC .... H04R 3/12; H04R 1/1016; H04R 2420/07; H04R 2430/20; H04W 4/80
See application file for complete search history.

(56) References Cited

U.S. PATENT DOCUMENTS 6,171,138 B1 * 1/2001 Lefebvre ............. H04M 1/0262 429/97
11,003,209 B2 5/2021 Seo
11,079,796 B2 8/2021 Choe
2013/0273981 A1 * 10/2013 Liu ..................... H01M 50/276 429/100
2013/0273982 A1 * 10/2013 Li ....................... H01M 50/247 429/100
2013/0286560 A1 * 10/2013 Liu ..................... H04M 1/0262 361/679.01
2019/0082083 A1 * 3/2019 Jarvis ..................... H04N 23/55
2019/0253544 A1 8/2019 Hu et al.
2019/0384358 A1 12/2019 Choe et al.
2020/0007669 A1 * 1/2020 Kwon ................ H04M 1/0264
2020/0344335 A1 10/2020 Lee et al.
(Continued)

FOREIGN PATENT DOCUMENTS

CN 206878180 U 1/2018
CN 107920432 A 4/2018
CN 108153026 A 6/2018
(Continued)

*Primary Examiner* — Lewis G West

(74) *Attorney, Agent, or Firm* — Slater Matsil, LLP

(57) ABSTRACT

Embodiments of this application relate to the technical field of electronics, and provide an electronic device. The electronic device includes: a middle frame; a housing assembly, including a battery cover, where the battery cover is arranged on the middle frame; and a printed circuit board, located between the battery cover and the middle frame.

20 Claims, 18 Drawing Sheets

(56) References Cited

U.S. PATENT DOCUMENTS

2020/0389991 A1* 12/2020 Shannon ............... C03C 21/002
2021/0409527 A1* 12/2021 Li ......................... G06F 1/1686

FOREIGN PATENT DOCUMENTS

| | | | |
|---|---|---|---|
| CN | 110365885 | A | 10/2019 |
| CN | 210839659 | U | 6/2020 |
| CN | 212973864 | U | 4/2021 |
| CN | 112887542 | A | 6/2021 |
| CN | 113452812 | A | 9/2021 |
| CN | 113966106 | A | 1/2022 |
| CN | 114079677 | A | 2/2022 |
| CN | 114466093 | A | 5/2022 |
| CN | 216529213 | U | 5/2022 |
| CN | 114827325 | A | 7/2022 |
| EP | 3794808 | A1 | 3/2021 |
| WO | 2020166811 | A1 | 8/2020 |
| WO | 2022068497 | A1 | 4/2022 |

* cited by examiner

ELECTRONIC DEVICE

CROSS-REFERENCE TO RELATED APPLICATIONS

This application is a national stage of International Application No. PCT/CN2023/092538, filed on May 6, 2023, which claims priority to Chinese Patent Application No. 202210714656.4, filed on Jun. 23, 2022. The disclosures of both of the aforementioned applications are hereby incorporated by reference in their entireties.

TECHNICAL FIELD

This application relates to the technical field of electronics, and in particular, to an electronic device.

BACKGROUND

With the continuous development of science and technology, a growing number of electronic devices such as mobile phones, tablet computers, or notebook computers are widely used in daily life and work of people, bringing huge convenience to the daily life and work of people.

People have increasing higher requirements not only on performance of electronic devices such as photographing, heat dissipation, or power consumption, but also on thicknesses and weights of electronic devices. How to reduce thicknesses and weights of electronic devices is an urgent problem to be resolved.

SUMMARY

To resolve the foregoing technical problem, this application provides an electronic device, which can realize thinning of electronic devices.

This application provides an electronic device. The electronic device includes: a middle frame; a housing assembly, including a battery cover, where the battery cover is arranged on the middle frame; and a printed circuit board, located between the battery cover and the middle frame. The battery cover also functions as a printed circuit board support.

The battery cover also functioning as a printed circuit board support means that a printed circuit board support in the electronic device is omitted and the battery cover is correspondingly improved so that the battery cover can further provide a function of the printed circuit board support in addition to the original function. Since the printed circuit board support is omitted, a thickness of the electronic device can be reduced by a thickness of at least one printed circuit board support, and a weight can be reduced, thereby facilitating a lightweight design of the electronic device. In addition, to-be-assembled structural members can be reduced, thereby reducing assembly costs.

In some possible implementations, the battery cover includes an exterior portion and at least one fixing portion. The exterior portion includes an external face and a structural face facing away from the external face. The fixing portion is located on a side of the structural face facing away from the external face. The fixing portion is arranged on the exterior portion to realize a fixing function of the printed circuit board support, without a need to arrange the printed circuit board support.

In some possible implementations, based on the battery cover including the fixing portion, the fixing portion and the exterior portion are integrally formed, that is, the structural face partially protrudes in a direction from the external face toward the structural face to form the fixing portion. Alternatively, the fixing portion and the exterior portion are independently formed, that is, a finished fixing portion is fixed to the exterior portion through welding or bonding. When the fixing portion and the exterior portion are integrally formed, the structure is simple. The fixing portion is formed while the exterior portion is formed. When the fixing portion and the exterior portion are independently formed, selection of materials for the exterior portion and the fixing portion is more flexible.

In some possible implementations, based on the battery cover including the fixing portion, the electronic device further includes a flexible printed circuit and a connector that are located between the battery cover and the middle frame. The flexible printed circuit is electrically connected with the printed circuit board through the connector. The fixing portion is in contact with the flexible printed circuit located on the connector. In an application scenario of the fixing portion, press fit of the connector is implemented through the fixing portion, so that the connector is stably fixed to a main board, thereby preventing the connector from loosening or falling off during use, and avoiding a large thickness and weight of the electronic device as a result of use of the printed circuit board support to implement press fit of the connector.

In some possible implementations, the battery cover includes an exterior portion and at least one bearing portion. The exterior portion includes an external face and a structural face facing away from the external face. The bearing portion is located on the side of the structural face facing away from the external face. The bearing portion includes a bearing sub-portion and a connecting sub-portion. The connecting sub-portion is connected between the structural face and the bearing sub-portion. An extending direction of the connecting sub-portion is different from an extending direction of the bearing sub-portion, so that a bearing groove is formed among the structural face, the bearing sub-portion, and the connecting sub-portion. The bearing portion is arranged on the exterior portion to realize a bearing function of the printed circuit board support, without a need to arrange the printed circuit board support.

In some possible implementations, based on the battery cover including the bearing portion, the electronic device further includes a functional device, and at least part of the functional device is located in the bearing groove. That is to say, some functional devices are borne through the bearing portion which serves as the printed circuit board support, to avoid a large thickness and weight of the electronic device as a result of use of the printed circuit board support to bear the functional devices.

In some possible implementations, based on at least part of the functional device being located in the bearing groove, the functional device includes a flash light or a near field communication coil. Two application scenarios of the bearing portion include that the bearing portion bears the flash light and/or the near field communication coil in replacement of the printed circuit board support.

In some possible implementations, the electronic device further includes at least one fixing structure configured to fix the battery cover and the printed circuit board, so that the battery cover is kept at a preset distance to the printed circuit board. In this way, a press fit effect of the fixing portion and a distance between the functional device borne in the bearing portion and the printed circuit board can be ensured.

In some possible implementations, based on the electronic device including the fixing structure, the fixing structure includes a screw. The screw includes a screw cap and a rod portion. A threaded hole is arranged on the battery cover. The rod portion of the screw extends through the threaded hole on the battery cover to fix the battery cover to the printed circuit board. When the fixing structure is the screw, the structure is simple and costs are low.

In some possible implementations, based on the fixing structure including the screw, each of the battery cover, the printed circuit board, and the middle frame is provided with the threaded hole. The rod portion of the screw extends through the threaded holes arranged on the battery cover, the printed circuit board, and the middle frame to fix the battery cover to the printed circuit board and fix the printed circuit board to the middle frame, thereby realizing integration of the battery cover, the printed circuit board, and the middle frame.

In some possible implementations, based on the fixing structure including the screw, a nut is attached to a surface of the printed circuit board. The rod portion of the screw extends through the threaded hole on the battery cover to be connected to the nut of the printed circuit board, to fix the battery cover to the printed circuit board, thereby realizing integration of the battery cover and the printed circuit board.

In some possible implementations, based on the fixing structure including the screw, when the battery cover includes the exterior portion, the exterior portion includes the external face, and a structural face facing away from the external face, the exterior portion further includes at least one first groove. The exterior portion is partially recessed from the external face in a direction from the external face toward the structural face to form the first groove, and the first groove is in communication with the threaded hole on the exterior portion. The screw cap of the screw is located in the first groove. That is to say, the screw is borne through the first groove, to prevent impact of the screw from protruding from a surface of the exterior portion and affecting an appearance.

In some possible implementations, based on the exterior portion including the at least one first groove, the exterior portion further includes a second groove. The exterior portion is partially recessed from the external face in the direction from the external face toward the structural face to form the second groove. The second groove has a larger size than the first groove, and is in communication with the first groove. The housing assembly further includes a shielding layer. The shielding layer is arranged in the second groove and covers the screw. That is to say, the screw is shielded through the shielding layer, to prevent the screw from being exposed from a surface and affecting the appearance of the electronic device. In addition, the shielding layer is borne through the second groove, to prevent the shielding layer from protruding from the surface of the exterior portion and affecting the appearance.

In some possible implementations, based on the housing assembly including the shielding layer, the shielding layer includes a lens, a PU leather, ceramic, or plastic. A person skilled in art may select the above according to actual situations to meet demands of different users.

In some possible implementations, based on the exterior portion including the first groove and the second groove, a plurality of first grooves and a plurality of second grooves are arranged. The plurality of second grooves are in communication with each other to form an annular groove, and the shielding layers inside the second grooves are a single-piece structure to form an annular shielding layer, which improves appearance quality of the electronic device, so that the electronic device has a fantastic appearance.

In some possible implementations, based on the exterior portion including the first groove and the second groove, the exterior portion further includes a third groove, and the exterior portion is partially recessed from the external face in the direction from the external face toward the structural face to form the third groove. The third groove is provided with the shielding layer. A center of the shielding layer located in the third groove and a center of the shielding layer located in the second groove are arranged in an annular shape, which improves the appearance quality of the electronic device, so that the electronic device has a fantastic appearance.

In some possible implementations, based on the electronic device further including the at least one fixing structure, when the battery cover includes the exterior portion and the at least one fixing portion, the exterior portion includes the external face and the structural face facing away from the external face, and the fixing portion is located on the side of the structural face facing away from the external face, the fixing structure is adjacent to the fixing portion; and/or when the battery cover includes the exterior portion and the at least one bearing portion, the exterior portion includes the external face and the structural face facing away from the external face, and the bearing portion is located on the side of the structural face facing away from the external face, the fixing structure is adjacent to the bearing portion. The screw is arranged in a targeted way, so that a number of screws is reduced, costs are reduced, and process steps are reduced.

In some possible implementations, based on the electronic device further including the at least one fixing structure, a position corresponding to an edge of the printed circuit board is provided with the fixing structure. Mere the fixing structure is mounted to an edge of the printed circuit board, to ensure the press fit effect of the fixing portion and the distance between the functional device borne in the bearing portion and the printed circuit board. Therefore, the number of screws is reduced, the costs are reduced, and the process steps are reduced.

In some possible implementations, the housing assembly further includes a decorative member. The decorative member includes a decorative member body and a skirt edge. The decorative member body, the skirt edge, and the battery cover are integrally formed to further reduce the thickness of the electronic device.

REFERENCE NUMERALS

10—Middle frame; 20—PCB; 40—Housing assembly: 50—Display; 60—Functional device: 70—FPC, 80—Battery; 90—BTB; 100—Fixing structure;

21—Main board; 22—Small board;

41—Battery cover; 42—Decorative member; 43—First bonding layer; 44—Second bonding layer; 45—Shielding layer; 46—Third bonding layer; 411—Exterior portion; 412—Fixing portion; 414—Decorative hole; 413—Bearing portion; 421—Decorative member body; 422—Skirt edge; 423—Lens; 4111—External face; 4112—Structural face; 4114—First groove; 4115—Second groove; 4116—Third groove; 4117—Protruding structure; 4131—Bearing sub-portion; 4132—Connecting sub-portion; 4133—Bearing groove;

61—Flash light; 62—Rear camera; 63—NFC coil; 64—Elastic piece;

101—Screw; 102—Threaded hole; 103—Nut; 1011—Screw cap; 1012—Rod portion.

DETAILED DESCRIPTION OF ILLUSTRATIVE EMBODIMENTS

The technical solutions in embodiments of this application are clearly and completely described in the following with reference to the drawings in embodiments of this application. Apparently, the described embodiments are merely some rather than all of the embodiments of this application. All other embodiments obtained by a person of ordinary skill in the art based on the embodiments of this application without making creative efforts shall fall within the protection scope of this application.

A term "and/or" herein describes only an association relationship for describing associated objects and represents that three relationships may exist. For example, A and/or B may represent: only A exists, both A and B exist, and only B exists.

Terms "first", "second", and the like in the specification of the embodiments of this application and the claims are used to distinguish between different objects, but are not used to indicate a specific sequence of objects. For example, a first target object and a second target object are used to distinguish between different target objects, but are not used to describe a specific sequence of the target objects.

In the embodiments of this application, a term such as "as an example" or "for example" is used to represent giving an example, an illustration, or a description. Any embodiment or design solution described as "in an example" or "for example" in the embodiments of this application should not explained as being more preferred or having more advantages than another embodiment or design solution. Exactly, use of the terms such as "in an example" or "for example" is intended to present a concept in a specific manner.

In the description of the embodiments of this application, unless otherwise stated, "a plurality of" means two or more. For example, a plurality of processing units mean two or more processing units, and a plurality of systems mean two or more systems.

Figure 1:
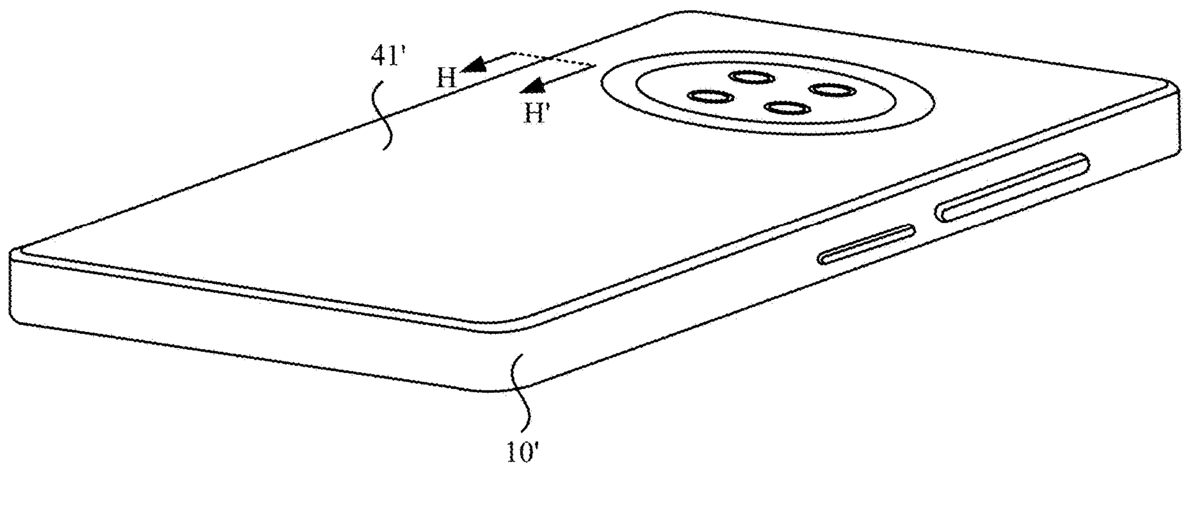
FIG. 1 is a schematic structural diagram of an electronic device.
Figure 2:
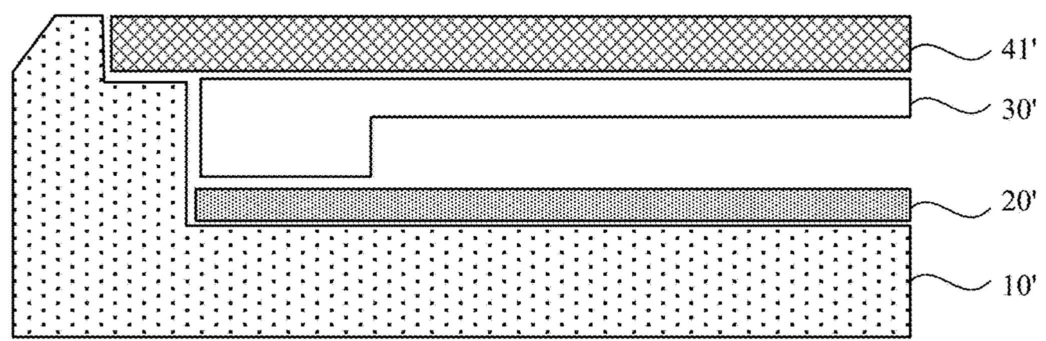
FIG. 2 is a sectional view of the electronic device shown in FIG. 1 in a direction HH'.

As shown in FIG. 1 and FIG. 2, FIG. 1 is a schematic structural diagram of an electronic device, and FIG. 2 is a sectional view of the electronic device shown in FIG. 1 in a direction HH. The electronic device includes a middle frame 10', a printed circuit board (Printed Circuit Boards, PCB) 20', a printed circuit board support 30', and a battery cover 41'. The PCB 20' and the printed circuit board support 30' are located between the middle frame 10' and the battery cover 41'. The printed circuit board support 30' is located on a side of the PCB 20' facing away from the middle frame 10'. The printed circuit board support 30' is configured to fix some devices on the PCB 20' and/or to bear some devices.

In order to prevent devices on the PCB 20' from colliding with the printed circuit board support 30' during assembly and use, a specific gap needs to be provided between some regions of the printed circuit board support 30' and the devices on the PCB 20'. In addition, in order to ensure strength of the printed circuit board support 30', the printed circuit board support 30' is configured with a relatively large thickness. For example, when the printed circuit board support 30' is made of plastic, the thickness thereof is usually at least 0.5 mm. When the printed circuit board support 30' is made of metal, the thickness thereof is usually at least 0.2 mm. Moreover, in order to ensure that the printed circuit board support 30 does not push the battery cover 41', a specific gap, such as a gap of 0.2 mm, needs to be reserved between the printed circuit board support 30' and the battery cover 41'. It may be learned that arrangement of the printed circuit board support 30' results in a large thickness and a large weight of the electronic device.

In order to resolve the foregoing technical problems, an embodiment of this application provides an electronic device. A battery cover also functions as a printed circuit board support, which means that a printed circuit board support in the electronic device is omitted and the battery cover is correspondingly improved so that the battery cover can further provide a function of the printed circuit board support in addition to the original function. Since the printed circuit board support is omitted, a thickness of the electronic device can be reduced by a thickness of at least one printed circuit board support, and a weight can be reduced, thereby facilitating a lightweight design of the electronic device. In addition, to-be-assembled structural members can be reduced, thereby reducing assembly costs.

Figure 3:
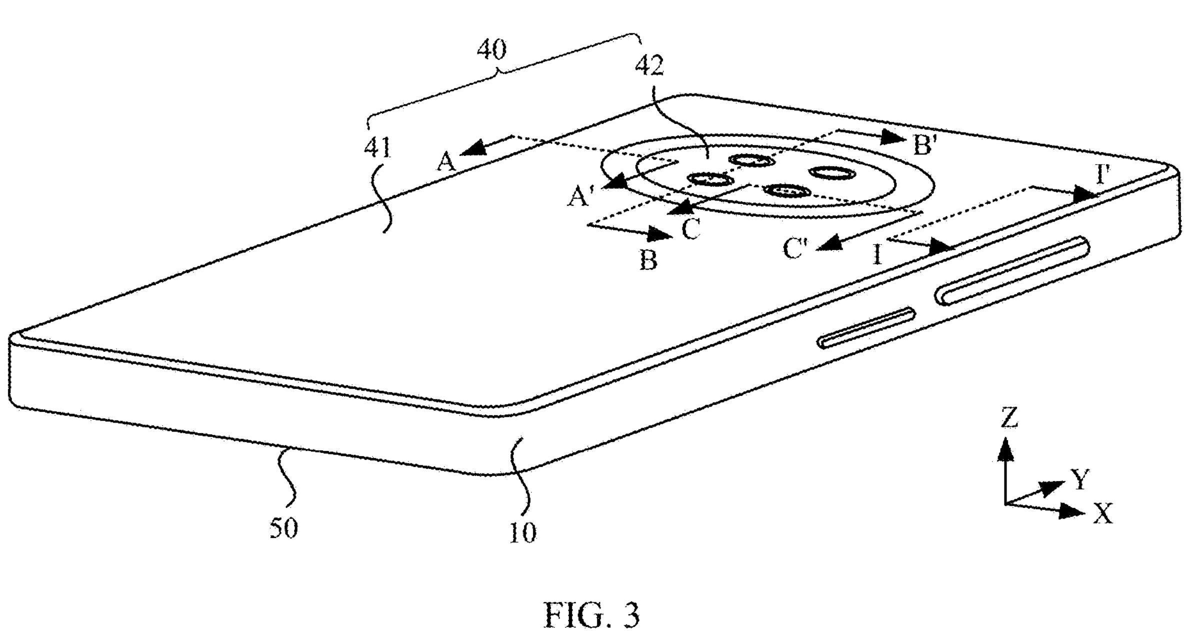
FIG. 3 is a schematic structural diagram of the electronic device according to an embodiment of this application.

The electronic device provided in this embodiment of this application may be a mobile phone, a computer, a tablet computer, a personal digital assistant (personal digital assistant, PDA for short), an on-board computer, a television, a smart wearable device, a smart home device, or the like. A specific form of the electronic device is not particularly limited in this embodiment of this application. As shown in FIG. 3, FIG. 3 is a schematic structural diagram of an electronic device according to an embodiment of this application. For ease of description, the electronic device is a mobile phone, for example.

In order to facilitate clear description of subsequent structural features and positional relationships between the structural features, positional relationships between structures within the mobile phone are defined by using an X-axis direction, a Y-axis direction, and a Z-axis direction. The X-axis direction is a width direction of the mobile phone, the Y-axis direction is a length direction of the mobile phone, and the Z-axis direction is a thickness direction of the mobile phone.

Figure 4:
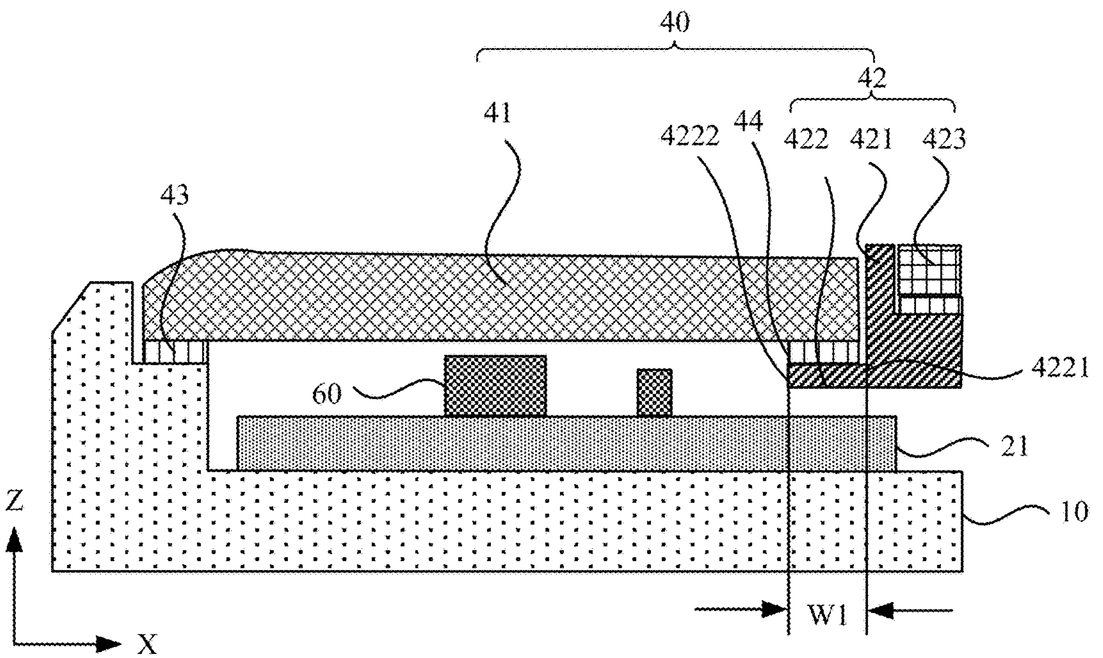
FIG. 4 is a sectional view of the electronic device shown in FIG. 3 in a direction AA' according to an embodiment of this application.

As shown in FIG. 3, the mobile phone includes a middle frame 10, a housing assembly 40, and a display 50. The middle frame 10 is located between the housing assembly 40 and the display 50. Referring to FIG. 4, FIG. 4 is a sectional view of the electronic device shown in FIG. 3 in a direction AA' direction according to an embodiment of this application. A first bonding layer 43 formed on the housing assembly 40 by using a back applied adhesive or by adhesive dispensing is adhered to the middle frame 10, to realize fixation of the housing assembly 40 and waterproof sealing of edges of the housing assembly 40 and the middle frame 10.

It should be noted herein that, in order to clearly show the positional relationship between the middle frame 10 and the housing assembly 40, a structure of the display 50 is not shown in FIG. 4. The same is true in the following embodiments, and this is not repeated in the following embodiments.

It should be further noted that, a manner of fixing the housing assembly 40 to the middle frame 10 is not limited to the foregoing example. In some optional embodiments, the housing assembly 40 may be fixed to the middle frame 10 through an engagement member.

In addition, in order to ensure assembly accuracy of the housing assembly 40, some positioning modules (not shown in the figure) may be mounted to the housing assembly 40. For example, the positioning modules include a positioning post. Alternatively, an outer profile of the housing assembly 40 is directly used as a limiting feature to ensure proper assembly.

Figure 5:
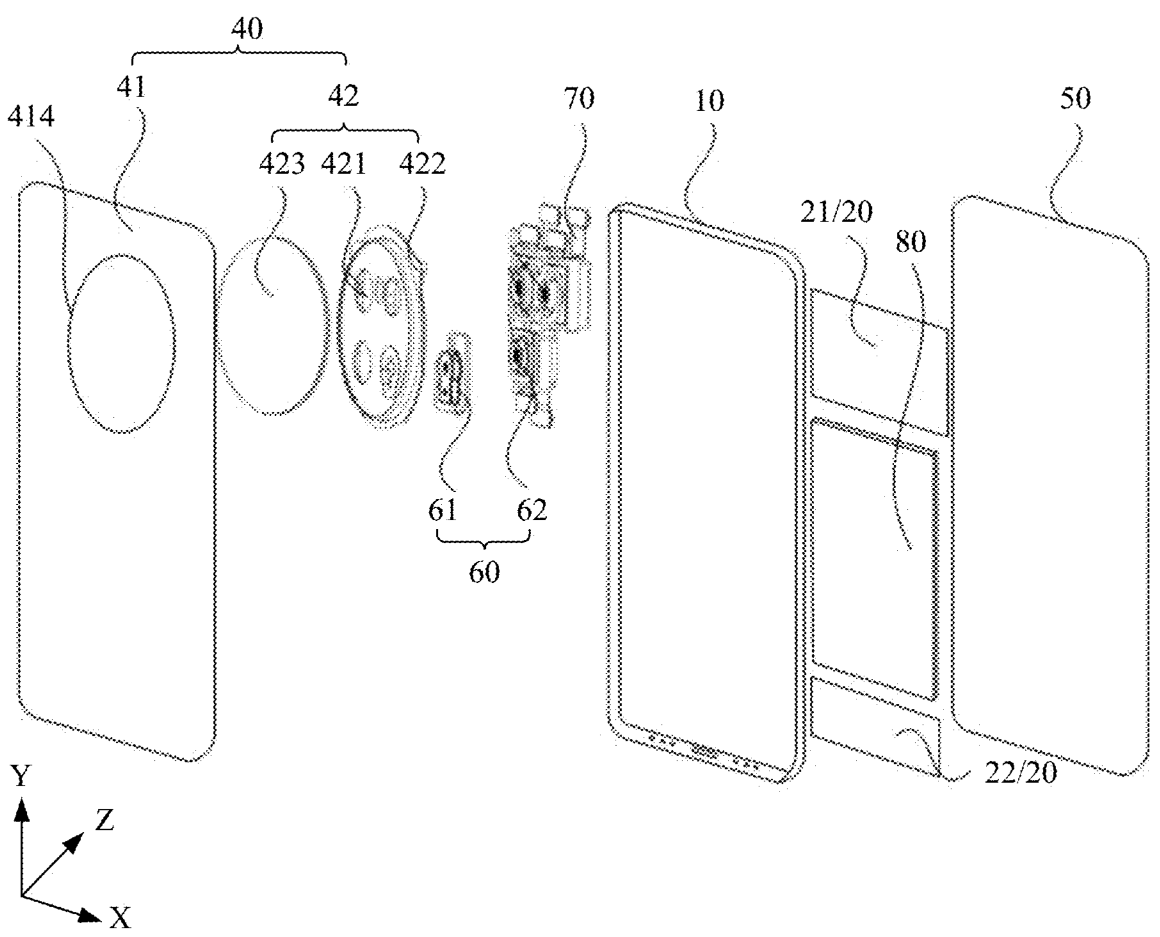
FIG. 5 is a schematic exploded view of the electronic device according to an embodiment of this application.
Figure 6:
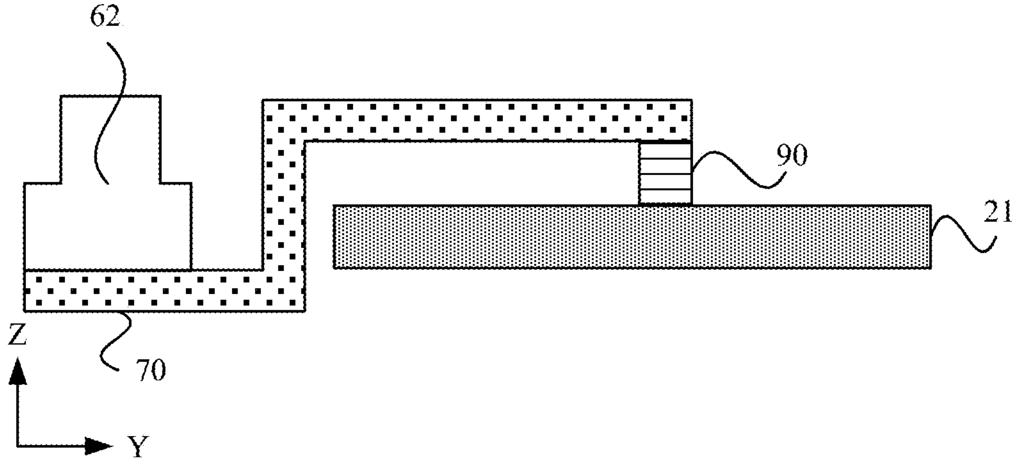
FIG. 6 is an application scenario diagram of an FPC according to an embodiment of this application.

The display 50, the middle frame 10, and the housing assembly 40 may define an accommodating cavity. With reference to FIG. 5 and FIG. 6, FIG. 5 is a schematic exploded view of the electronic device according to an embodiment of this application, and FIG. 6 is an application scenario diagram of an FPC according to an embodiment of this application. Structures such as a PCB 20, a functional device 60, a flexible printed circuit (flexible printed circuit, FPC) 70, a battery 80, and a board to board (board to board, BTB) connector 90 are arranged in the cavity. The PCB 20 includes a main board 21, a small board 22. The functional device 60 includes, for example, a flash light 61, a rear camera 62, a near field communication (Near Field Communication, NFC) coil (not shown in the figure), an elastic piece (not shown in the figure), and a microphone (not shown). One or more rear cameras 62 may be arranged. When a plurality of rear cameras 62 are arranged, the plurality of rear cameras 62 may have different functions. For example, in a possible implementation, one of the rear cameras 62 serves as a main camera, another one of the rear cameras 62 serves as a zoom camera, another one of the rear cameras 62 serves as a wide angle camera, and so on.

For example, still referring to FIG. 6, the rear cameras 62 are electrically connected to the main board 21 through the FPC 70. In some embodiments, the BTB 90 is arranged between the FPC 70 and the main board 21. The FPC 70 is electrically connected to the main board 21 through the BTB 90.

It should be noted herein that, although the FPC 70 connects the rear cameras 62 to the main board 21 through the BTB 90 in the foregoing example, the FPC 70 may further connect another functional device 60 to the main board 21 through the BTB 90 to realize electrical connection between the another functional device 60 and the main board 21, and/or the FPC 70 may further connect the another functional device 60 to the small board 22 through the BTB 90 to realize electrical connection between the another functional device 60 and the small board 22. This is not particularly limited in this embodiment of this application. Unless otherwise specified, the FPC 70 connecting the rear cameras 62 to the main board 21 through the BTB 90 is used as an example below.

Still referring to FIG. 4 and FIG. 5, the housing assembly 40 includes a battery cover 41 and a decorative member 42. A decorative hole 414 is arranged on the battery cover 41. The decorative member 42 is arranged at the decorative hole 414. The decorative member 42 includes a decorative member body 421. In the Z-axis direction, the rear cameras 62 are opposite to the decorative member body 421.

In some embodiments, the decorative member 42 may further include a skirt edge 422 for fixing the decorative member body 421 to the battery cover 41 and a second bonding layer 44 formed by using a back applied adhesive or by adhesive dispensing. The skirt edge 422 includes a first annular edge 4221 and a second annular edge 4222. The first annular edge 4221 is an edge in contact with the decorative member body 421. The second annular edge 4222 is an edge located on a side of the first annular edge 4221 facing away from the decorative member body 421. A smallest distance from any point on the first annular edge 4221 to the second annular edge 4222 is a size W1 of the skirt edge 422. A larger size W1 of the skirt edge 422 indicates a larger area of the second bonding layer 44 located on the skirt edge 422, and thereby leads to more sufficient fixation of the decorative member 42 to the battery cover 41 through the skirt edge 422. Certainly, in practical application, the size W1 of the skirt edge 422 cannot be infinite. In some possible implementations, the size W1 of the skirt edge 422, for example, may be greater than or equal to 1.0 mm or less than or equal to 2 mm. For example, the size W1 of the skirt edge 422 may be 1.5 mm. In this way, occupation of an excessively large internal space of the electronic device due to an excessively large size W1 of the skirt edge 422 is avoided, and infirm fixation of the decorative member 42 to the battery cover 41 due to an excessively small size W1 of the skirt edge 422 is avoided. In addition, waterproof sealing is realized.

In some embodiments, the decorative member 42 further includes a lens 423. The lens 423 is fixed to the decorative member body 421. The rear cameras 62 acquire light sources through the decorative member body 421 and the lens 423.

A shape of the decorative hole 414 is not limited in this embodiment of this application. For example, the shape of the decorative hole 414 may be a racetrack, a circle, a rounded square, or a rounded rectangle. It may be understood that, the shape of a racetrack may be a shape formed by two arcs and two opposite sides of a rectangle. The two arcs are arranged opposite to each other, and the two arcs are both adjacently connected to the opposite sides.

It may be understood that a profile of the decorative member body 421 and the lens 423 correspond to the shape of the decorative hole 414. For example, when the shape of the decorative hole 414 is a circle, the profile of the decorative member body 421 and shapes of the lens 423 are both circles.

It should be noted herein that, in the description of the foregoing examples, the decorative member 42 is a single-piece structure, but this does not constitute a limitation on this application. In another optional embodiment of this application, the decorative member 42 may not be a single-piece structure. For example, a scheme which uses decorative members with internal and external screws may be adopted. Correspondingly, the lens 423 is not necessarily a complete lens, and may include independent small lenses. Alternatively, a decorative member partially (a camera position) protruding out may be adopted.

Figure 7:
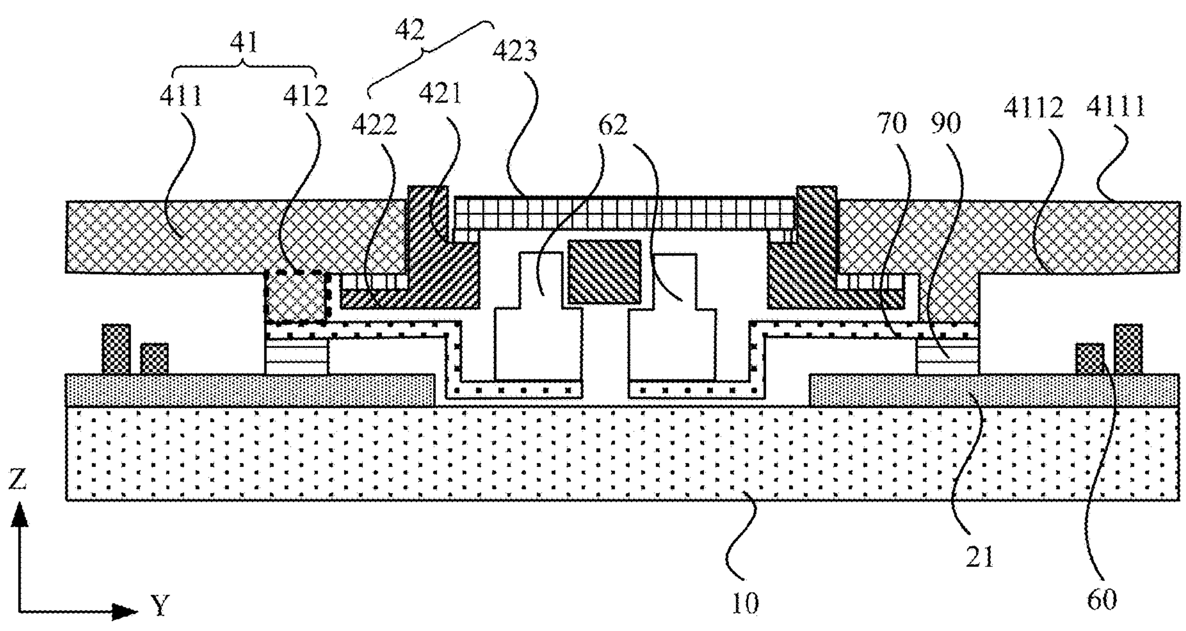
FIG. 7 is a sectional view of the electronic device shown in FIG. 3 in a direction BB' according to an embodiment of this application.

Referring to FIG. 7, FIG. 7 is a sectional view of the electronic device shown in FIG. 3 in a direction BB' according to an embodiment of this application. The battery cover 41 includes an exterior portion 411 and at least one fixing portion 412. In the Z-axis direction, the exterior portion 411 includes an external face 4111 and a structural face 4112 facing away from the external face 4111. In the Z-axis direction, the structural face 4112 partially protrudes to form the fixing portion 412. The fixing portion 412 is in contact with the FPC 70 directly above the BTB 90, to implement press fit of the BTB 90 through the fixing portion 412, so that the BTB 90 is stably fixed to the main board 21, thereby preventing the BTB 90 from loosening or falling off during use.

It should be noted herein that, the exterior portion 411 and the fixing portion 412 may be integrally formed. Alternatively, the fixing portion 412 may be fixed to the exterior portion 411 through welding or bonding.

Figure 8:
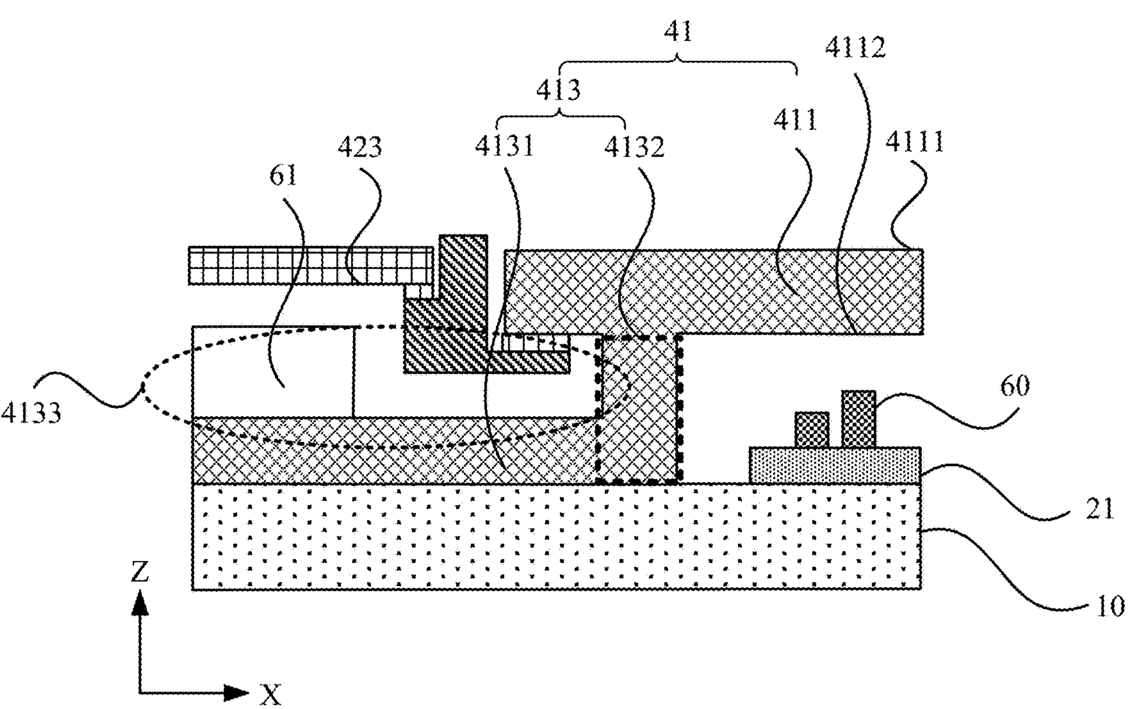
FIG. 8 is a sectional view of the electronic device shown in FIG. 3 in a direction CC' according to an embodiment of this application.
Figure 9:
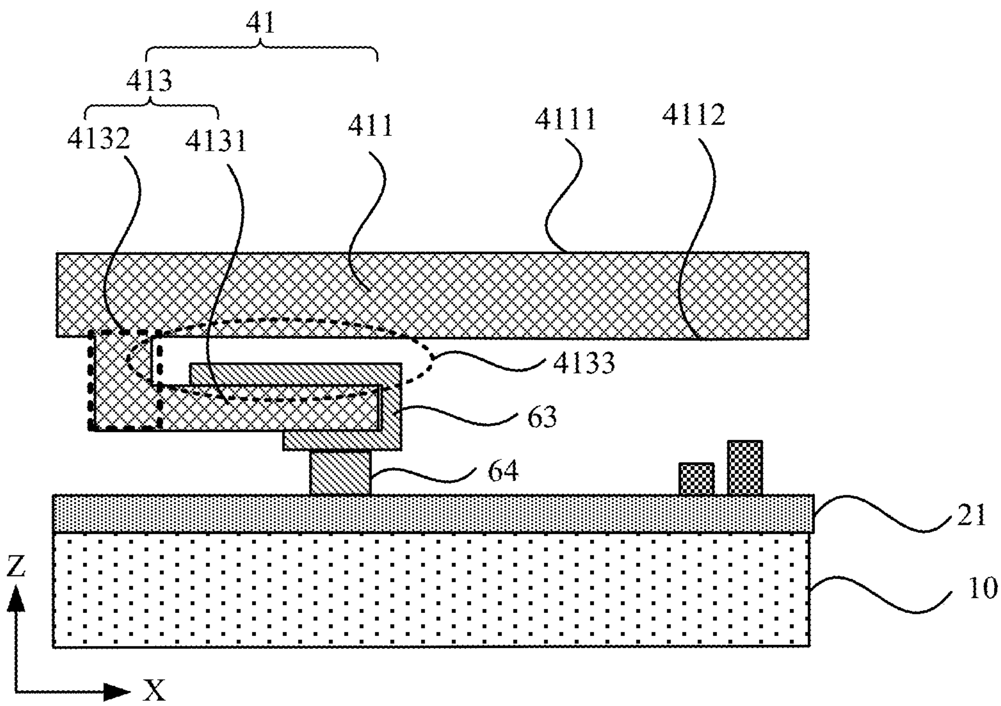
FIG. 9 is a sectional view of the electronic device shown in FIG. 3 in a direction II' according to an embodiment of this application.

Referring to FIG. 8, FIG. 8 is a sectional view of the electronic device shown in FIG. 3 in a direction CC' according to an embodiment of this application. The battery cover 41 further includes at least one bearing portion 413. The bearing portion 413 and the fixing portion 412 are located on the same side of the exterior portion 411. The bearing portion 413 includes a bearing sub-portion 4131 and a connecting sub-portion 4132. The connecting sub-portion 4132 is connected between the structural face 4112 and the bearing sub-portion 4131. An extending direction of the connecting sub-portion 4132 is different from that of the bearing sub-portion 4131. For example, the extending direction of the connecting sub-portion 4132 is parallel to the Z-axis direction, and the extending direction of the bearing sub-portion 4131 is perpendicular to the Z axis. In this case, a bearing groove 4133 is formed among the structural face 4112, the bearing sub-portion 4131, and the connecting sub-portion 4132. The bearing groove 4133 is configured to bear the functional device, such as the flash light 61 and/or the near field communication coil. As shown in FIG. 9, FIG. 9 is a sectional view of the electronic device shown in FIG. 3 in a direction II' according to an embodiment of this application. The functional device includes, for example, an NFC coil 63. A part of the NFC coil 63 is located in the bearing groove 4133 and another part thereof is bent to a side of the bearing sub-portion 4131 facing away from the structural face 4112, to implement press fit and elastic connection to the elastic piece 64 (which may be the BTB) of the main board 21.

It should be noted herein that, the exterior portion 411 and the bearing portion 413 may be integrally formed. Alternatively, the bearing portion 413 may be fixed to the exterior portion 411 through welding or bonding.

Figure 10:
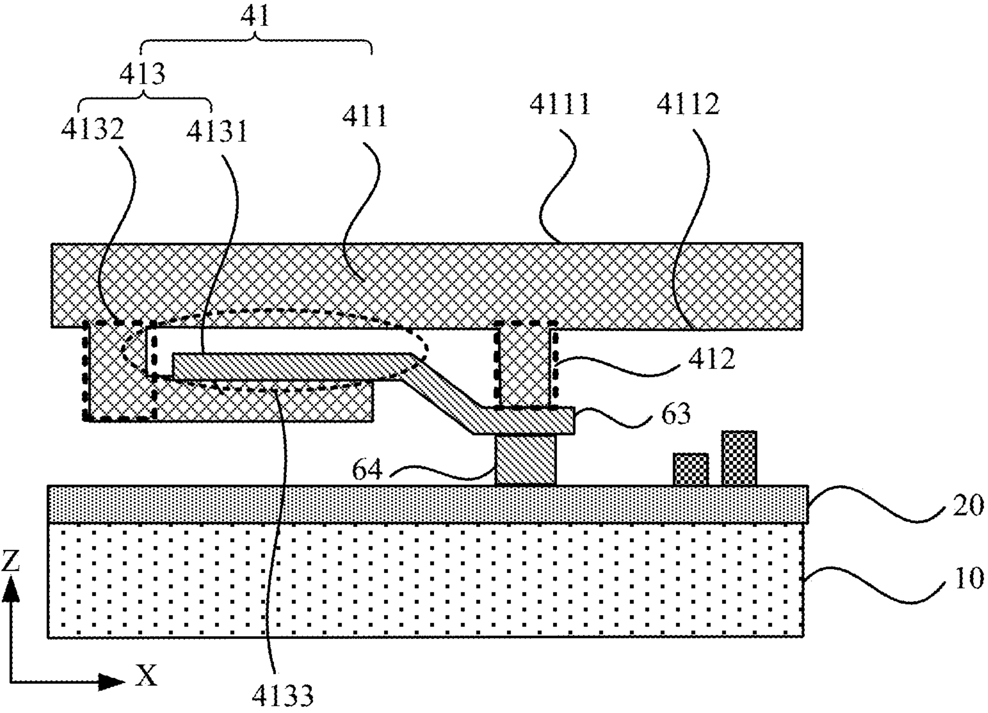
FIG. 10 is another sectional view of the electronic device shown in FIG. 3 in the direction II' according to an embodiment of this application.

It should be further noted that, when the functional device includes the NFC coil 63, the manner of implementing press fit and elastic connection of the NFC coil 63 to the elastic piece of the main board 21 is not limited to bending a part of the NFC coil 63 to the side of the bearing sub-portion 4131 facing away from the structural face 4112. Referring to FIG. 10, FIG. 10 is another sectional view of the electronic device shown in FIG. 3 in the direction II according to an embodiment of this application. A part of NFC coil 63 is located in the bearing groove 4133, and another part thereof is directly arranged to implement press fit and elastic connection to the elastic piece 64 (which may be a connecting structure such as the BTB) located on a side of the bearing groove 4133. In this case, in order to ensure effectiveness of the NFC coil 63 press fit and elastic connection to the elastic piece 64, a side of the NFC coil 63 facing away from the elastic piece 64 is further provided with the fixing portion 412. The fixing portion 412 is used to implement press fit of the NFC coil 63, to prevent the NFC coil 63 from separating from the elastic piece 64.

It should be further noted that, in the description of the foregoing examples, the fixing portion 412 is configured to fix the BTB 90 and the NFC coil 63 and the bearing portion 413 is configured to bear the flash light 61 and the NFC coil 63, but this does not constitute a limitation on this application. For any structure fixed and supported by a printed circuit board support, the battery cover may be correspondingly arranged to achieve the same function as the printed circuit board support. Since the battery cover 41 also functions as the printed circuit board support, the thickness of the battery cover 41 is the same as the thickness of the printed circuit board support, that is, a thickness of the mobile phone can be reduced by a thickness of at least one printed circuit board support, and a weight can be reduced, thereby facilitating a lightweight design of the electronic device. In addition, to-be-assembled structural members can be reduced, thereby reducing assembly costs. In addition, since the printed circuit board support is omitted, problems such as a failure of press fit to the BTB 90 caused by improper assembly of the support and a battery cover impression as a result of lifting of the battery cover by the support can be avoided. If a microphone needs to be arranged under the main board 21 or the small board 22, which emits sounds through the decorative member 42, since support channels can be reduced, a risk in sealing can be lowered. In addition, since the battery cover 41 has a sufficient area, layout and position limitations on the microphone are reduced.

Figure 11:
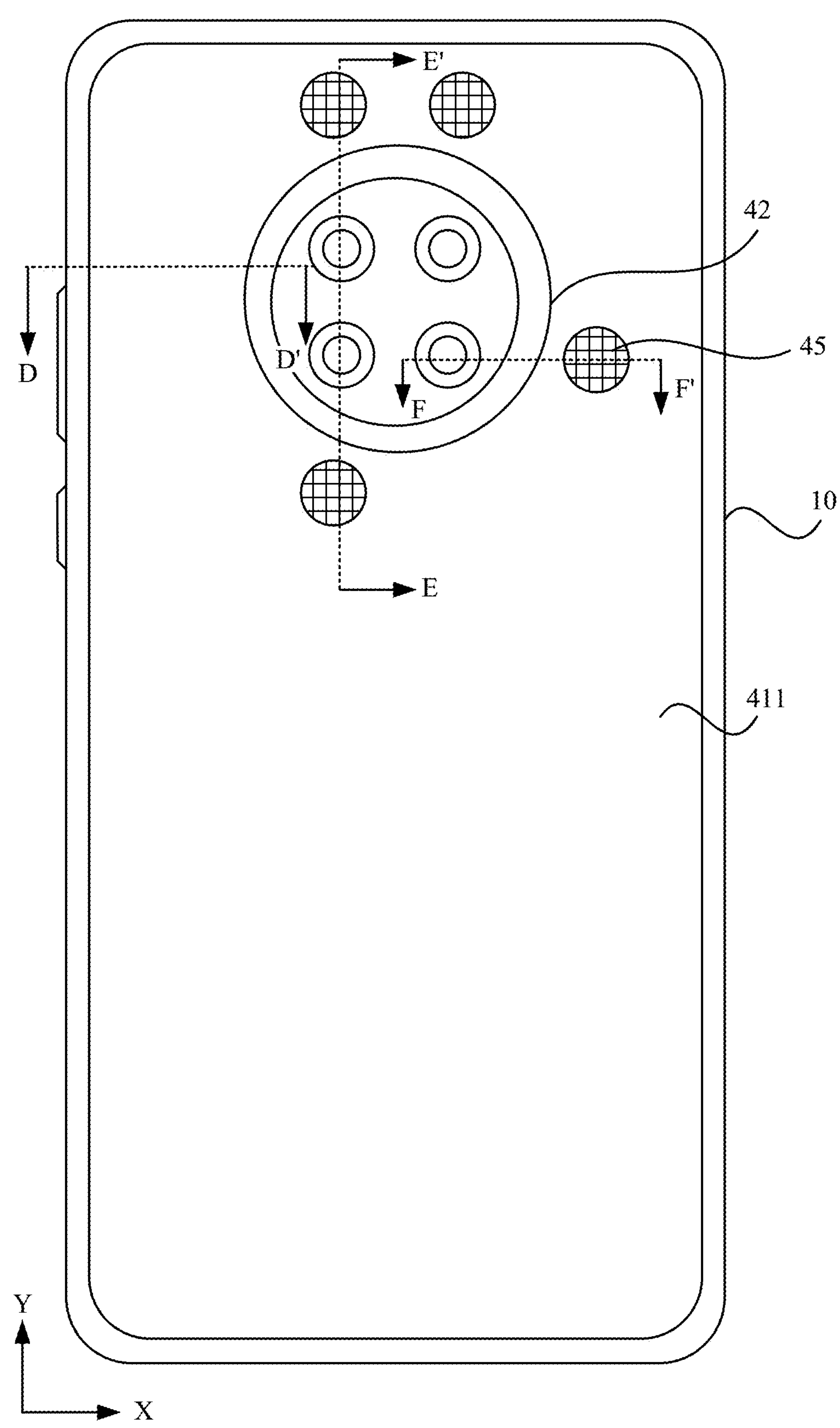
FIG. 11 is a schematic structural diagram of another electronic device according to an embodiment of this application.
Figure 12:
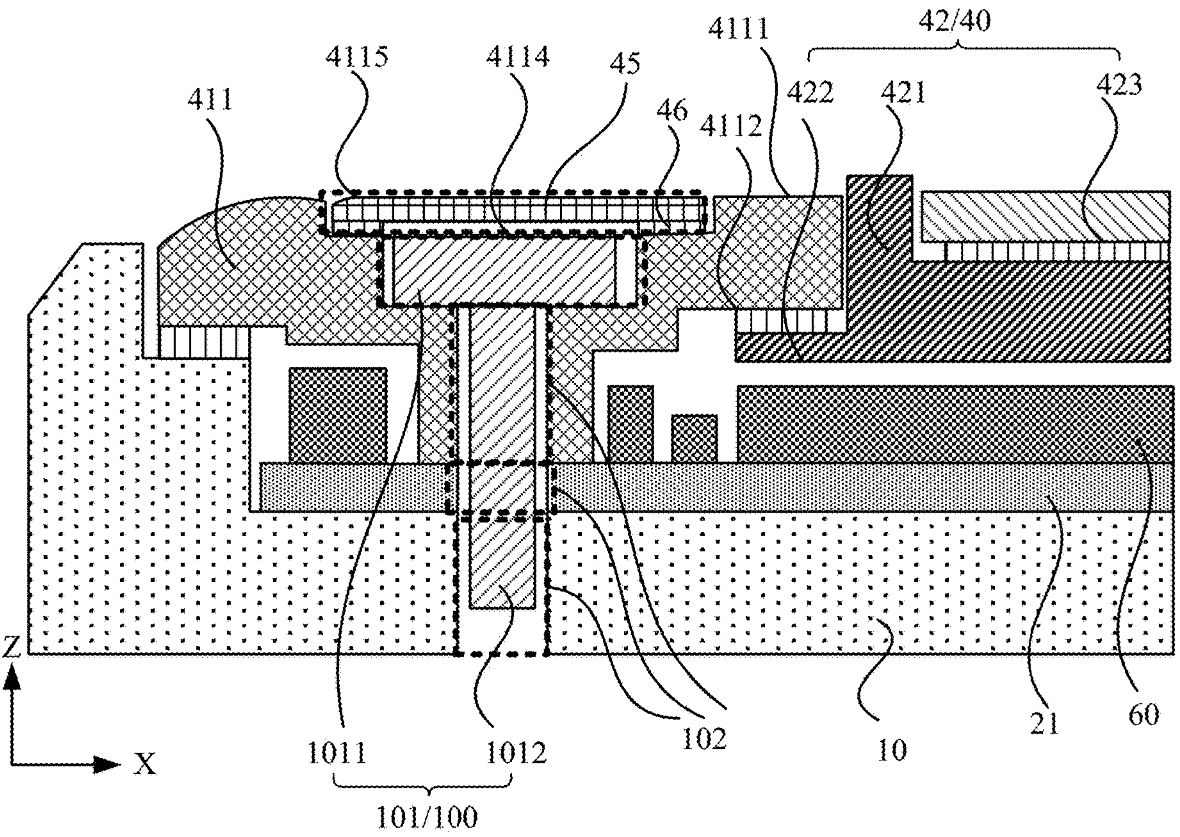
FIG. 12 is a sectional view of the electronic device shown in FIG. 11 in a direction DD' according to an embodiment of this application.

In order to ensure the press fit effect of the fixing portion 412, FIG. 11 and FIG. 12 are shown. FIG. 11 is a schematic structural diagram of another electronic device according to an embodiment of this application, and FIG. 12 is a sectional view of the electronic device shown in FIG. 11 in a direction DD' according to an embodiment of this application. The mobile phone further includes at least one fixing structure 100. The fixing structure 100 is configured to fix the battery cover 41 and the main board 21, to avoid a failure of press fit of the fixing portion 412 caused by a gap between the fixing portion 412 and a to-be-fixed structure as a result of dropping.

In a possible implementation, still referring to FIG. 12, the fixing structure 100 includes a screw 101. The screw 101 includes a screw cap 1011 and a rod portion 1012. A threaded hole 102 is arranged on each of the exterior portion 411, the main board 21, and the middle frame 10. The rod portion 1012 of the screw 101 extends through the threaded holes 102 arranged on the exterior portion 411, the main board 21, and the middle frame 10 to lock and attach the battery cover 41 to the main board 21 and the main board 21 to the middle frame 10, to realize integration of the battery cover 41, the main board 21, and the middle frame 10.

Figure 13:
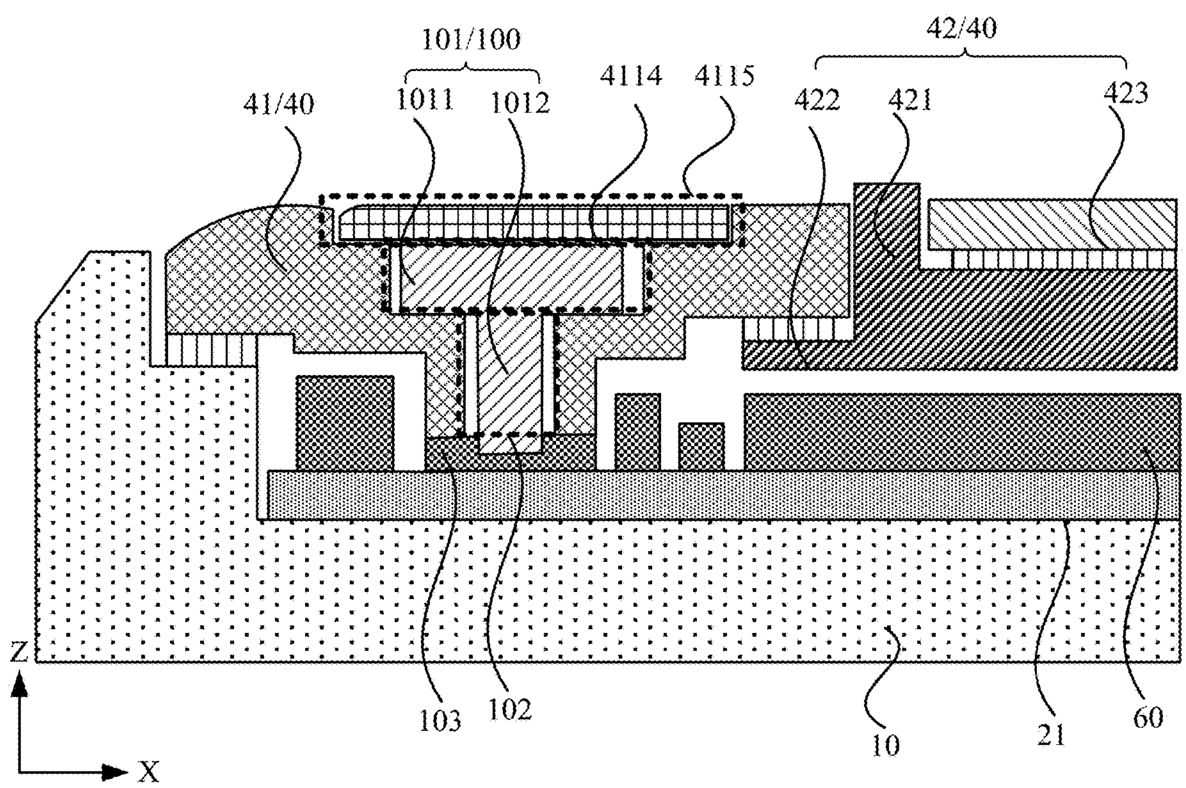
FIG. 13 is another sectional view of the electronic device shown in FIG. 11 in the direction DD' according to an embodiment of this application.

In another possible implementation, referring to FIG. 13, FIG. 13 is another sectional view of the electronic device shown in FIG. 11 in the direction DD' according to an embodiment of this application. The fixing structure 100 includes the screw 101. The screw 101 includes the screw cap 1011 and the rod portion 1012. The exterior portion 411 is provided with the threaded hole 102. A nut 103 is attached to a surface of the main board 21. The rod portion 1012 of the screw 101 extends through the threaded hole 102 on the exterior portion 411 to be connected to the nut 103 on the main board 21, so as to lock and attach the battery cover 41 to the main board 21, thereby realizing integration of the battery cover 41 and the main board 21.

In the foregoing two cases, still referring to FIG. 12, the exterior portion 411 further includes at least one first groove 4114. The exterior portion 411 is partially recessed from the external face 4111 in the Z-axis direction to form the first groove 4114, and the first groove 4114 is in communication with the threaded hole 102 on the exterior portion 411. The screw cap 1011 of the screw 101 is located in the first groove 4114, to prevent the screw cap 1011 from protruding from the external face 4111.

In order to make the screw 101 and corresponding structural features invisible from outside, the following solution is adopted. Still referring to FIG. 12, the exterior portion 411 further includes a second groove 4115. The exterior portion 411 is partially recessed from the external face 4111 in the Z-axis direction to form the second groove 4115. The second groove 4115 has a larger size than the first groove 4114 and is in communication with the first groove 411. The housing assembly 40 further includes a shielding layer 45 arranged in the second groove 4115. In addition, an orthographic projection of the shielding layer 45 on a plane defined by the X and Y axes covers an orthographic projection of the screw 101 on the plane defined by the X and Y axes, to shield the exposed screw 101.

It should be noted that, the size of the second groove 4115 being greater than that of the first groove 4114 means that an orthographic projection of the second groove 4115 on the plane defined by the X and Y axes covers an orthographic projection of the first groove 4114 on the plane defined by the X and Y axes. For example, when a shape of the orthographic projection of the second groove 4115 on the plane defined by the X and Y axes and a shape of the orthographic projection of the first groove 4114 on the plane defined by the X and Y axes are circles, a diameter of the second groove 4115 is greater than a diameter of the first groove 4114.

In order to ensure stability of the shielding layer 45, the housing assembly 40 further includes a third bonding layer 46 formed by using a back applied adhesive or by adhesive dispensing. The shielding layer 45 is fixed in the second groove 4115 through the third bonding layer 46.

A type of the shielding layer 45 is not limited in this embodiment of this application. A person skilled in this art may select a type according to actual situations. For example, the shielding layer 45 includes, for example, a lens, a PU leather, ceramic, plastic, or the like. When the shielding layer 45 includes the lens, the lens may be an ink-sprayed lens or a lens having a function of dazzling diaphragm. Certainly, the lens may alternatively be a transparent lens to meet demands of different users.

A position of the screw 101 is not limited in this embodiment of this application. A person skilled in the art may select a position according to actual situations.

Figure 14:
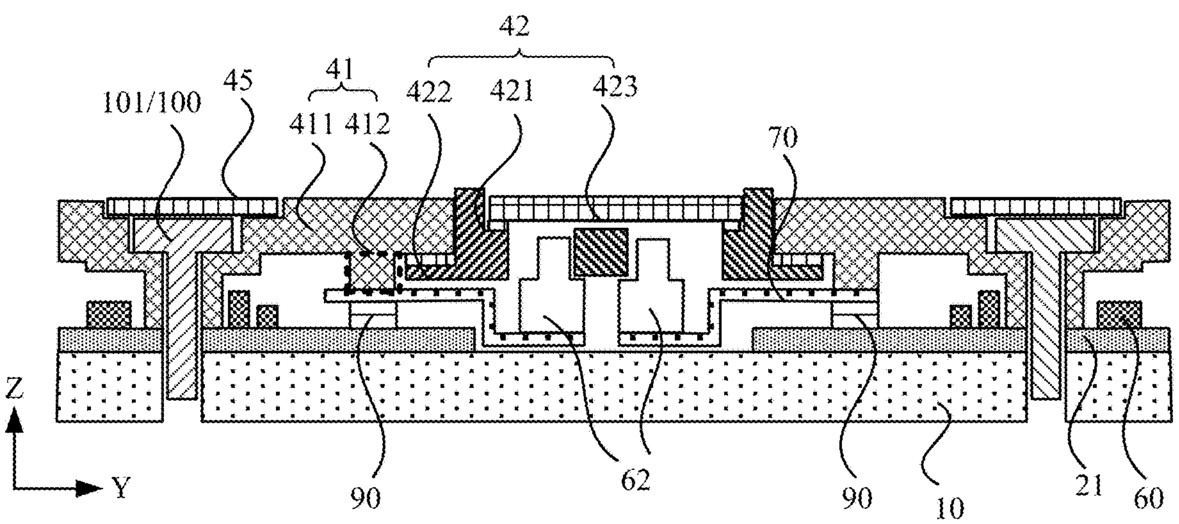
FIG. 14 is a sectional view of the electronic device shown in FIG. 11 in a direction EE' according to an embodiment of this application.
Figure 15:
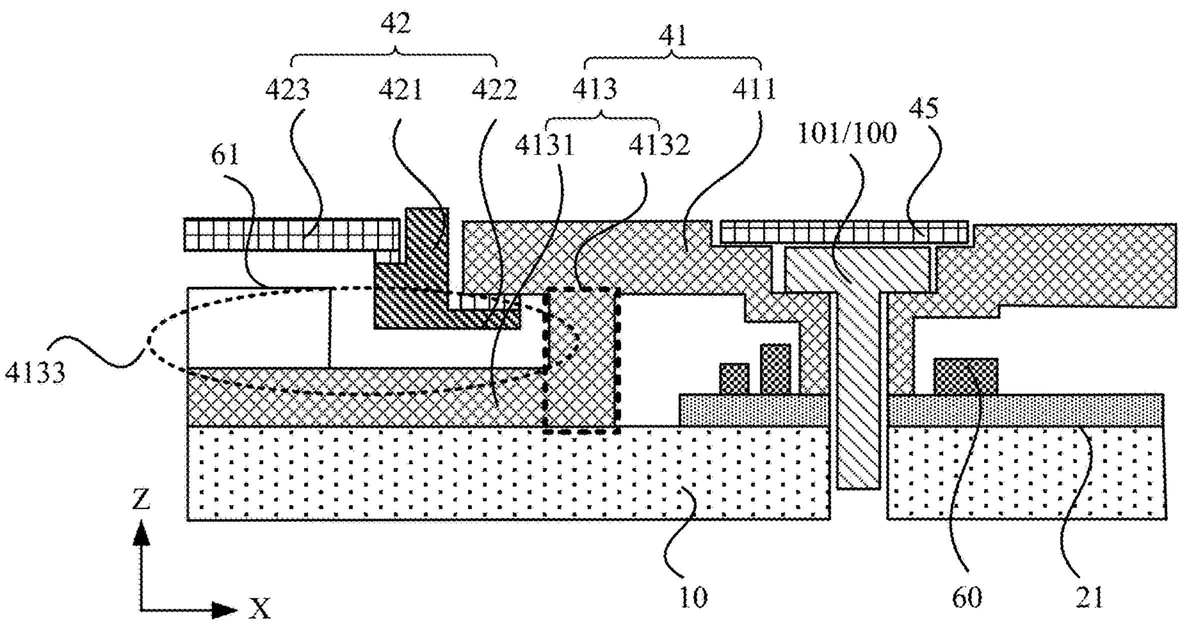
FIG. 15 is a sectional view of the electronic device shown in FIG. 11 in a direction FF' according to an embodiment of this application.
Figure 16:
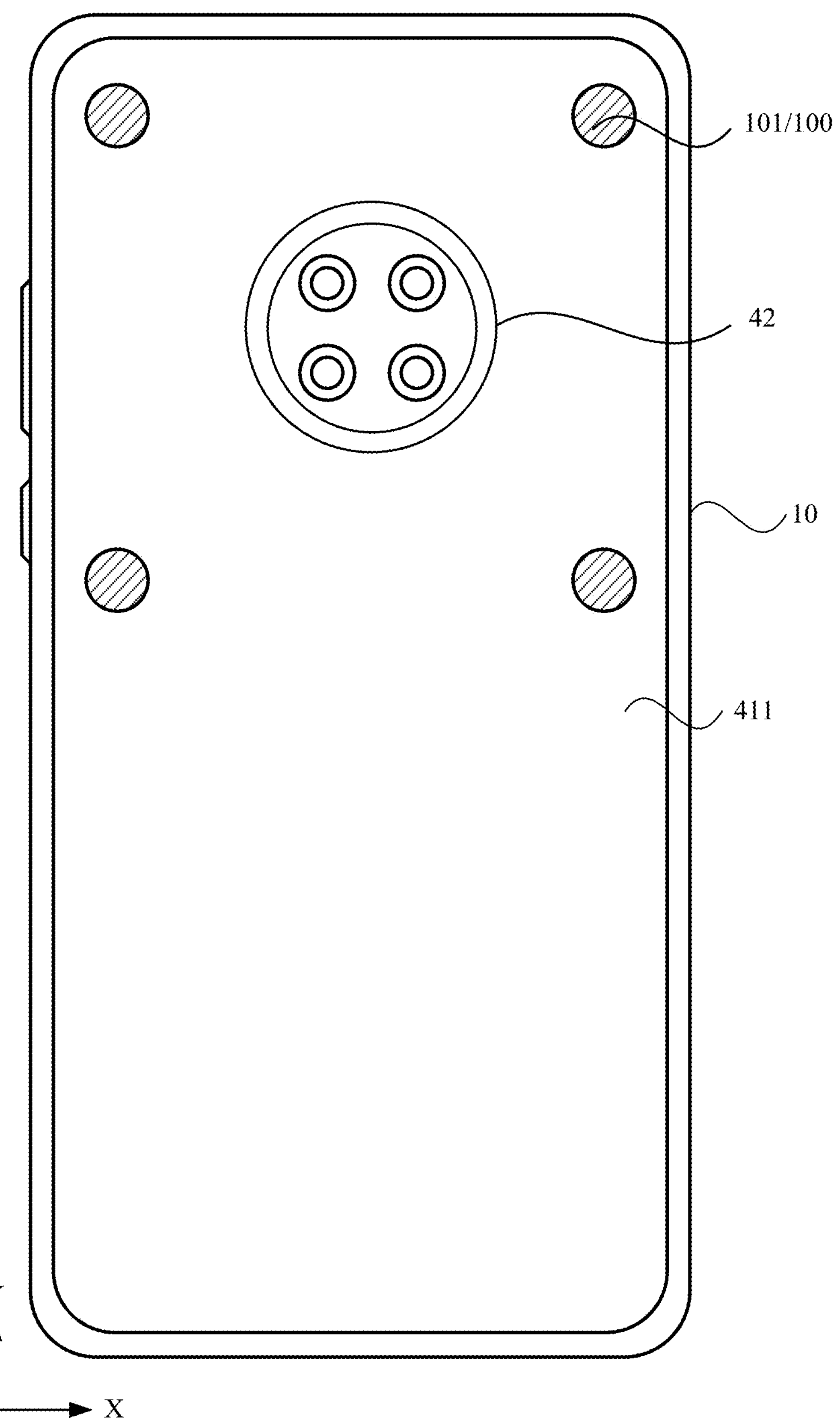
FIG. 16 is a schematic structural diagram of another electronic device according to an embodiment of this application.

For example, referring to FIG. 14 and FIG. 15, FIG. 14 is a sectional view of the electronic device shown in FIG. 11 in a direction EE according to an embodiment of this application, and FIG. 15 is a sectional view of the electronic device shown in FIG. 11 in a direction FF' according to an embodiment of this application. The screw 101 is adjacent to the fixing portion 412, to ensure effective press fit of the fixing portion 412. In addition, the screw 101 is adjacent to the bearing portion 413, to ensure a specific distance between the functional device borne by the bearing portion 413 and the main board 21 or the exterior portion 411. In addition/alternatively, referring to FIG. 16, FIG. 16 is a schematic structural diagram of another electronic device according to an embodiment of this application. The screw 101 is arranged at a position corresponding to the edge of the main board 21. That is to say, the screw 101 is arranged in a targeted manner, to reduce a number of screws 101, reduce costs, and reduce process steps.

It should be noted that, it may be learned from the foregoing content that the housing assembly 40 may be arranged on the middle frame 10 through the first bonding layer 43 or an engagement member. If sufficient screws 101 are arranged, the first bonding layer 43 or the engagement member may be omitted.

It should be further noted that, in the description of the foregoing examples, the fixing structure 100 includes the screw 101, but this does not constitute a limitation on this application. Any fixing structure 100 providing a fixing effect and ensuring the press fit effect of the fixing portion 412 falls within the protection scope of the embodiments of this application. In some embodiments, the fixation implemented by using the fixing structure 100 may alternatively be implemented by using a snap, by adhesive dispensing, or by using a back applied adhesive.

Figure 17:
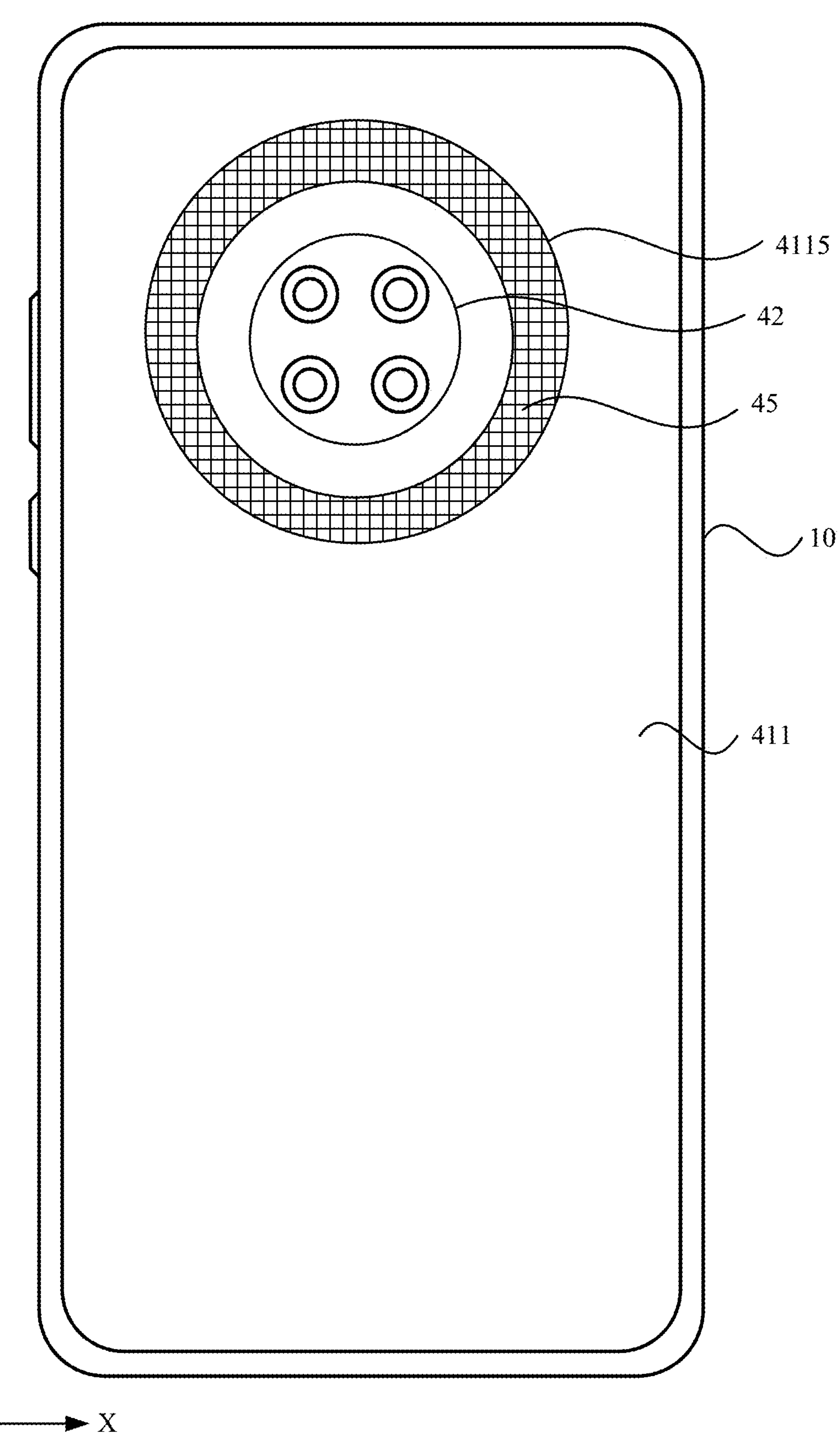
FIG. 17 is a schematic structural diagram of another electronic device according to an embodiment of this application.
Figure 18:
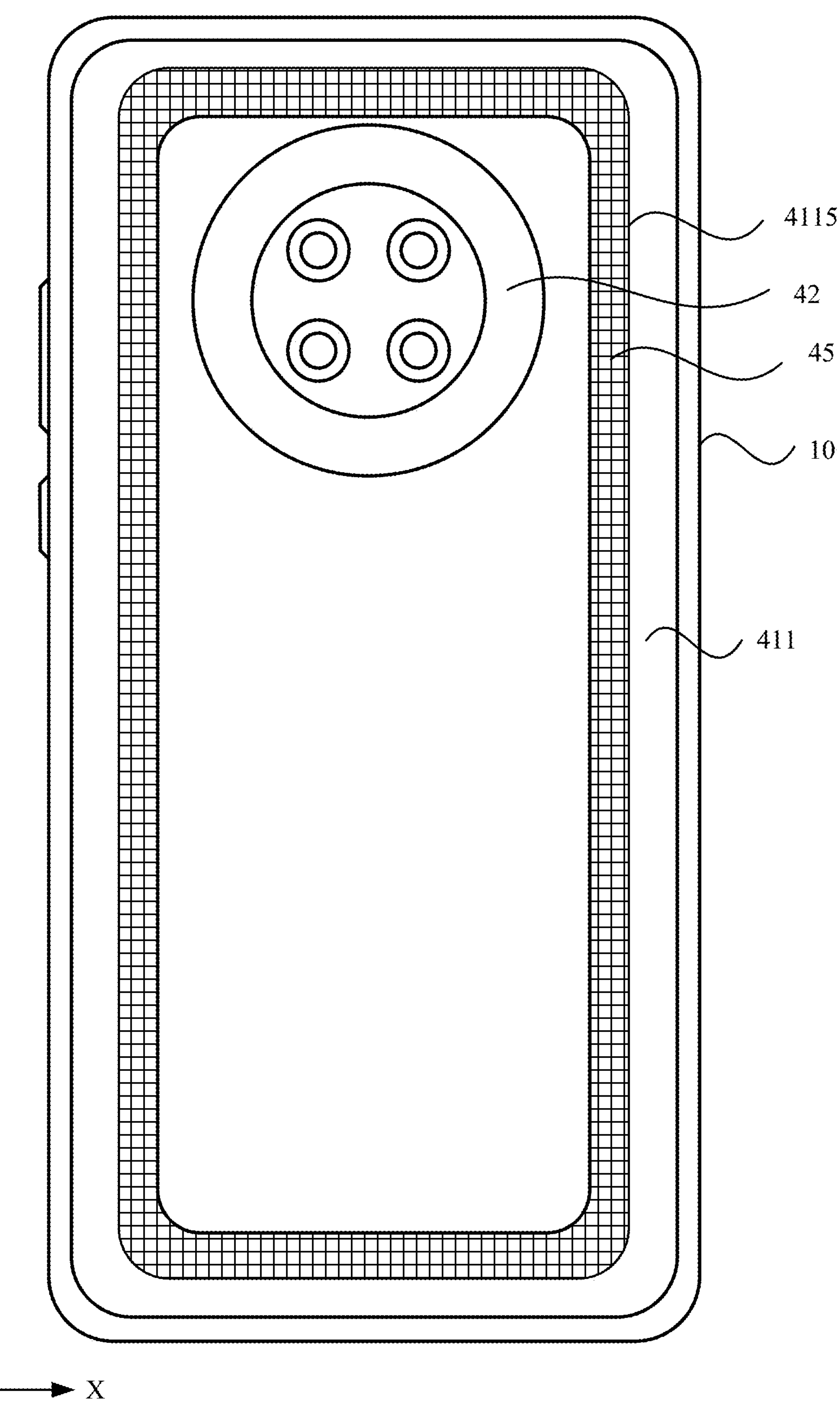
FIG. 18 is a schematic structural diagram of another electronic device according to an embodiment of this application.
Figure 19:
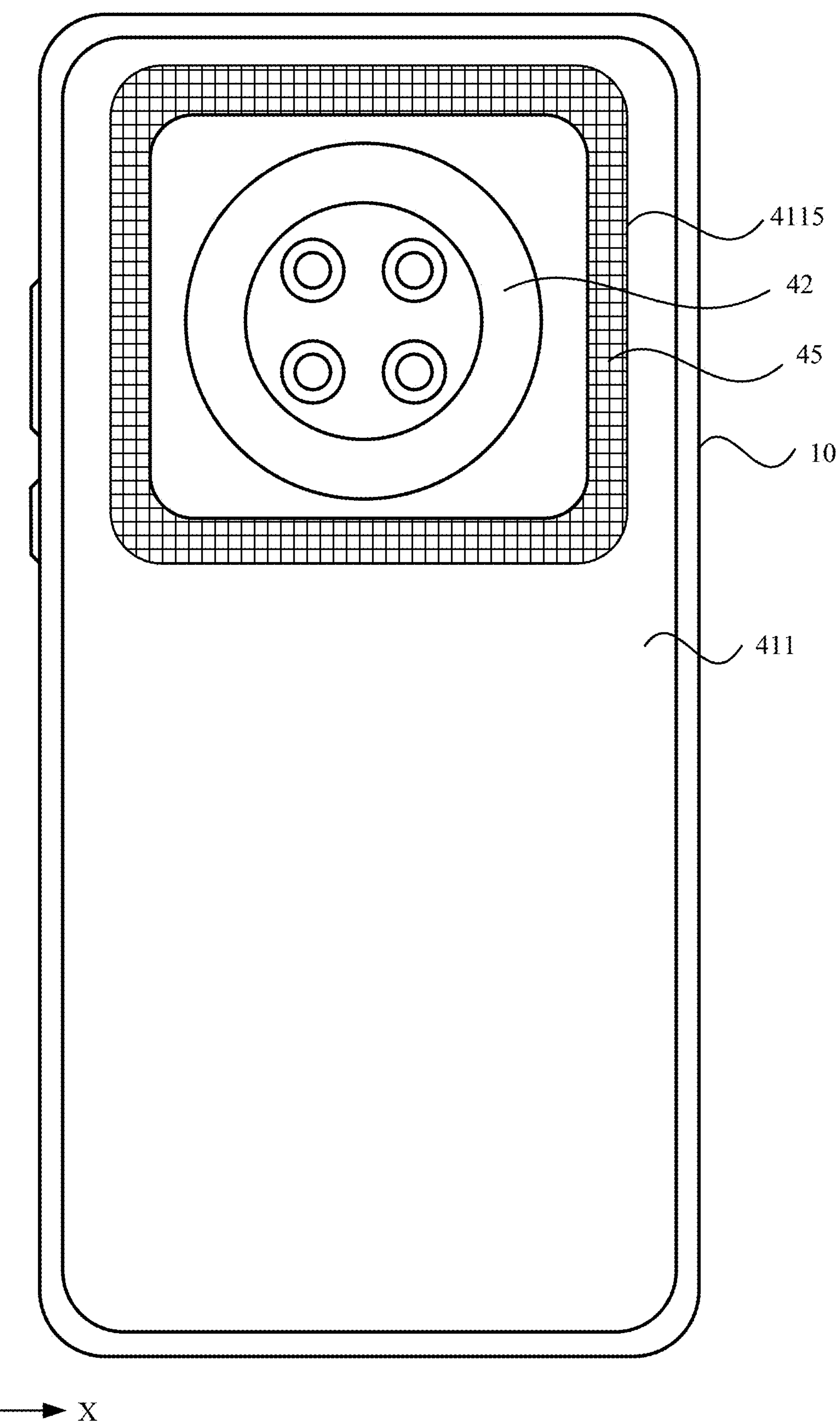
FIG. 19 is a schematic structural diagram of another electronic device according to an embodiment of this application.

In some possible implementations, in order to improve appearance quality of the mobile phone, referring to FIG. 17, FIG. 17 is a schematic structural diagram of another electronic device according to an embodiment of this application. A plurality of second grooves 4115 are in communication with each other to form an annular groove. The shielding layers 45 inside the second grooves 4115 is a single-piece structure to form an annular shielding layer 45. For example, the annular groove includes, for example, a circular groove. Correspondingly, the shielding layer 45 is a circular shielding layer, as shown in FIG. 17. The annular groove includes, for example, a rectangular annular groove, and correspondingly, the shielding layer 45 is a rectangular annular shielding layer, as shown in FIG. 18. FIG. 18 is a schematic structural diagram of another electronic device according to an embodiment of this application. The annular groove includes, for example, a square annular groove, and correspondingly, the shielding layer 45 is a square annular shielding layer, as shown in FIG. 19. FIG. 19 is a schematic structural diagram of another electronic device according to an embodiment of this application.

Figure 20:
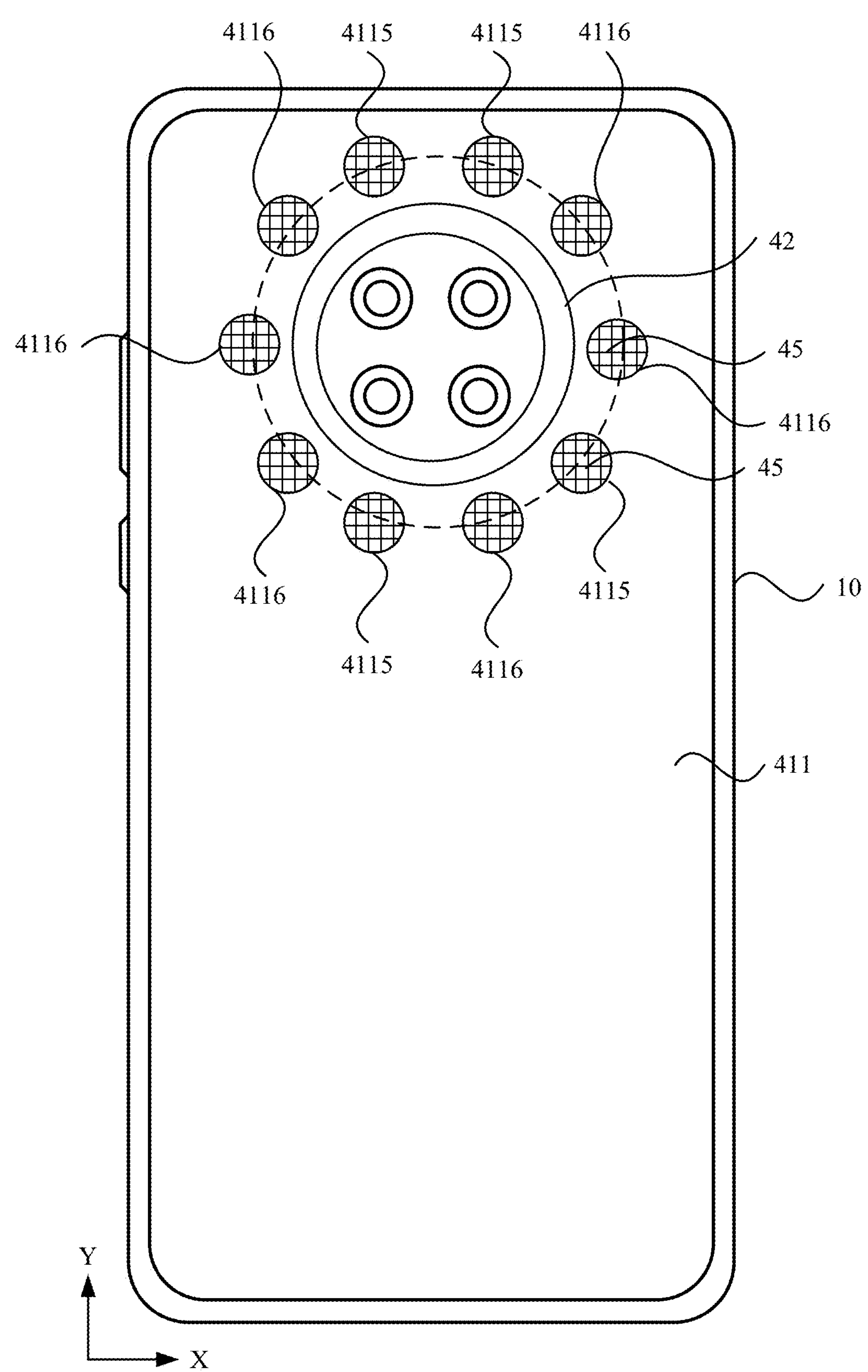
FIG. 20 is a schematic structural diagram of another electronic device according to an embodiment of this application.

In still some other possible implementations, referring to FIG. 20, FIG. 20 is a schematic structural diagram of another electronic device according to an embodiment of this application. A plurality of third grooves 4116 may be further independently arranged on the exterior portion 411. The exterior portion 411 is partially recessed from the external face 4111 in the Z-axis direction to form the third grooves 4116. Each of the third grooves 4116, for example, has the same size and shape as the second groove 4115. The third groove 4116 is provided with the shielding layer 45. A center of the shielding layer 45 located in the third groove 4116 and a center of the shielding layer 45 located in the second groove 4115 are arranged in an annular shape.

It should be noted that, the third groove 4116 having the same size and the shape as the second groove 4115 means that the orthographic projection of the second groove 4115 on the plane defined by the X and Y axes has the same size and shape as the orthographic projection of the first groove 4114 on the plane defined by the X and Y axes. For example, when a shape of an orthographic projection of the third groove 4116 on a plane defined by the X and Y axes and the shape of the orthographic projection of the second groove 4115 on the plane defined by the X and Y axes are circles, the diameter of the second groove 4115 is equal to a diameter of the third groove 4116.

Figure 21:
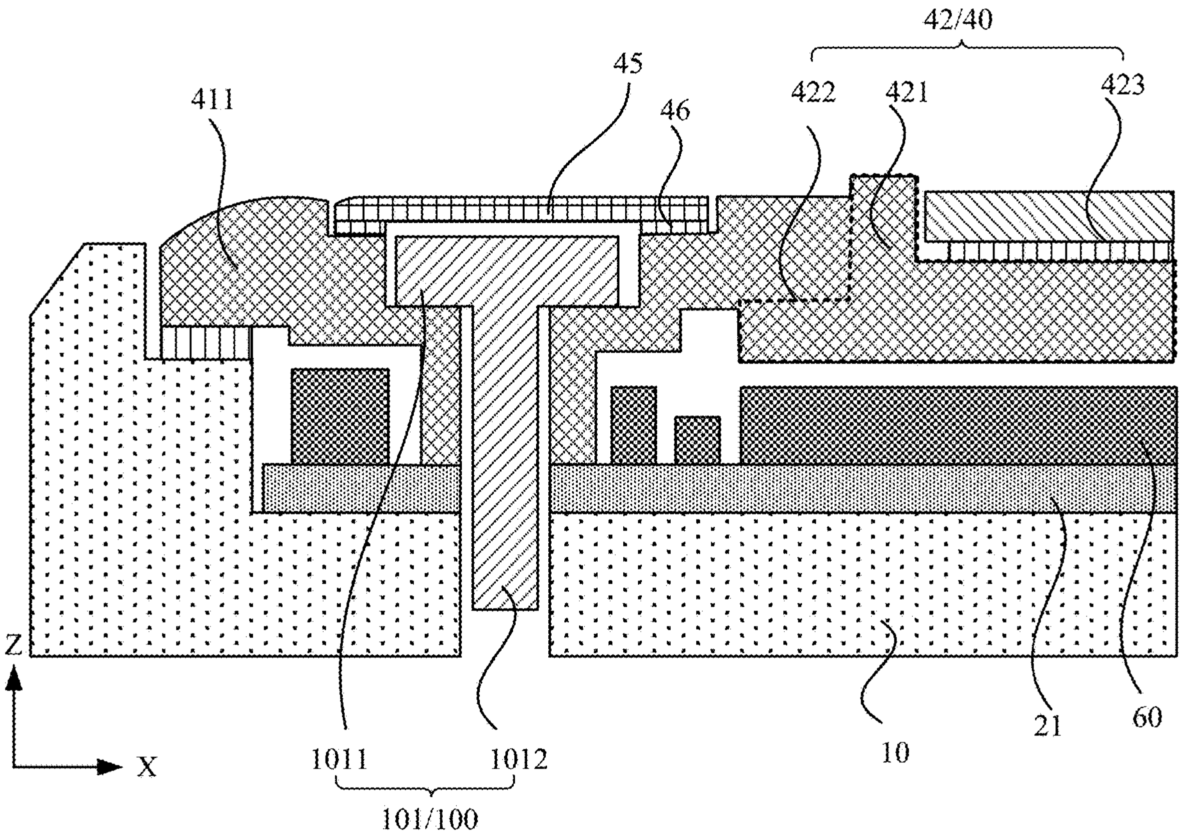
FIG. 21 is another sectional view of the electronic device shown in FIG. 11 in the direction DD' according to an embodiment of this application.

In addition, in order to further reduce the thickness of the electronic device, referring to FIG. 21, FIG. 21 is another sectional view of the electronic device shown in FIG. 11 in the direction DD' according to an embodiment of this application. The decorative member body 421 and the skirt edge 422 of the decorative member 42 and the battery cover 41 are integrally formed. When the decorative member body 421 and the skirt edge 422 of the decorative member 42 and the battery cover 41 are integrally formed, an assembly space required for the decorative member 42 and the battery cover 41 is reduced, thereby reducing the thickness of the whole electronic device. In addition, an assembly gap between the decorative member 42 and the battery cover 41 is reduced, which realizes high precision and a desirable appearance. Moreover, liquid inlet paths of the decorative member 42 and the battery cover 41 are removed, which improves waterproof performance of the whole electronic device. In addition, the integral formation of the battery cover 41 and the decorative member 42 can increase strength of the battery cover and the decorative member, which can avoid a problem of an insufficient wall thickness of a part of the decorative member 42 in an extreme space, and prevent abnormal noise when the decorative member 42 is pressed.

A material of the battery cover 41 is not limited in this embodiment of this application. The exterior portion 411, the fixing portion 412, and the bearing portion 413 may be integrally formed, provided that the threaded hole 102, the fixing portion 412, the bearing portion 413, the first groove 4114, the second groove 4115, and the third groove 4116 may be formed. For example, the material of the battery cover 41 includes metal, plastic, or the like. When the fixing portion 412 and the bearing portion 413 are fixed to the exterior portion 411 through welding or bonding, the exterior portion 411 may be made of a single material, such as plastic or a fiberglass. The plastic includes polycarbonate (Polycarbonate, PC), polyamide (Polyamide, PA), and the like. The exterior portion may alternatively be made of a composite material, such as a combination of plastic and metal or a combination of plastic and ceramic. When the exterior portion 411 is made of the composite material, the material may be processed together, or may be fixed together through welding or bonding.

Figure 22:
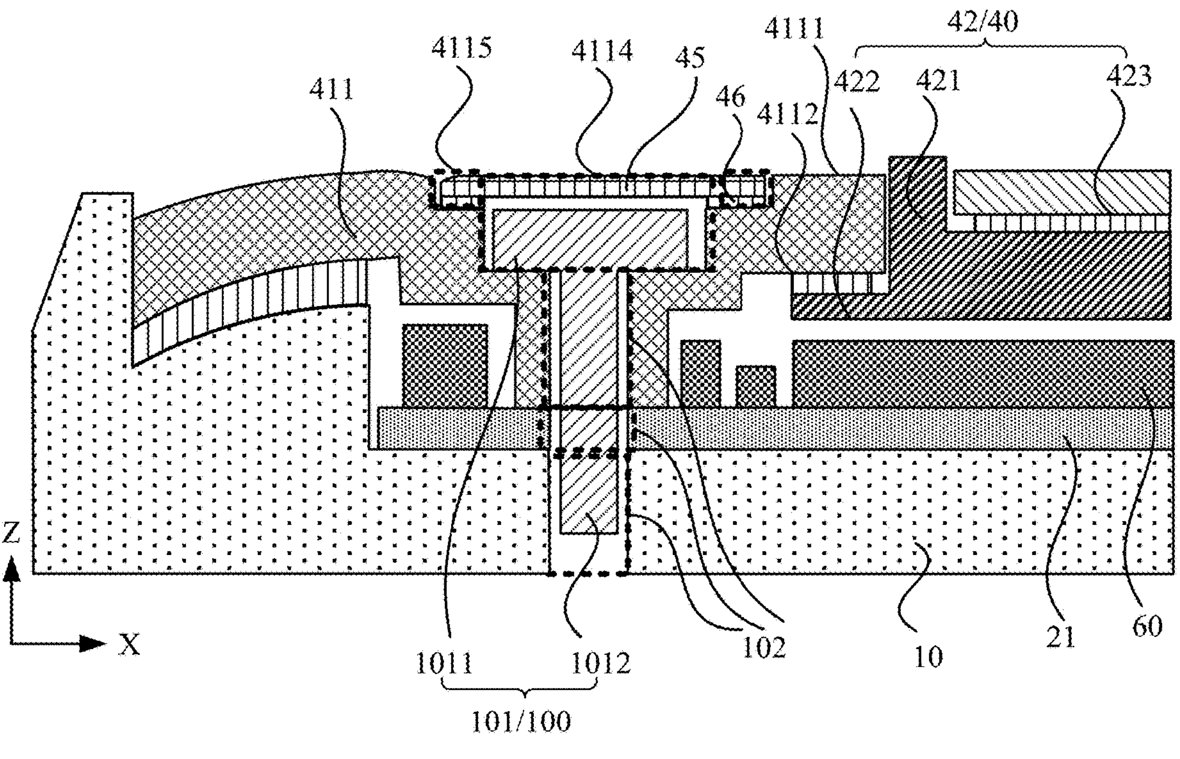
FIG. 22 is another sectional view of the electronic device shown in FIG. 11 in the direction DD' according to an embodiment of this application.

In addition, in the description of the foregoing examples, the battery cover 41 is a 2.5D (Dimensions, dimension) battery cover 41, but this model of the battery cover 41 does not constitute a limitation on this application. In some embodiments, the battery cover 41 may be a 2D battery cover 41 (not shown in the figure), or may be a 3D battery cover 41. For example, referring to FIG. 22, FIG. 22 is another sectional view of the electronic device shown in FIG. 11 in the direction DD' according to an embodiment of this application. When the battery cover 41 is the 3D battery cover 41, an arcing position of a 3D curved surface is not limited to a cover position of the shielding layer 45. The shielding layer 45 may also adopt a 3D model. For example, the 3D battery cover 41 may be formed through injection molding, hot pressing, hot bending, or the like. If the 3D model is retained at a position having the screw 101, flexible materials such as a PU leather may be selected as for the shielding layer 45.

Figure 23:
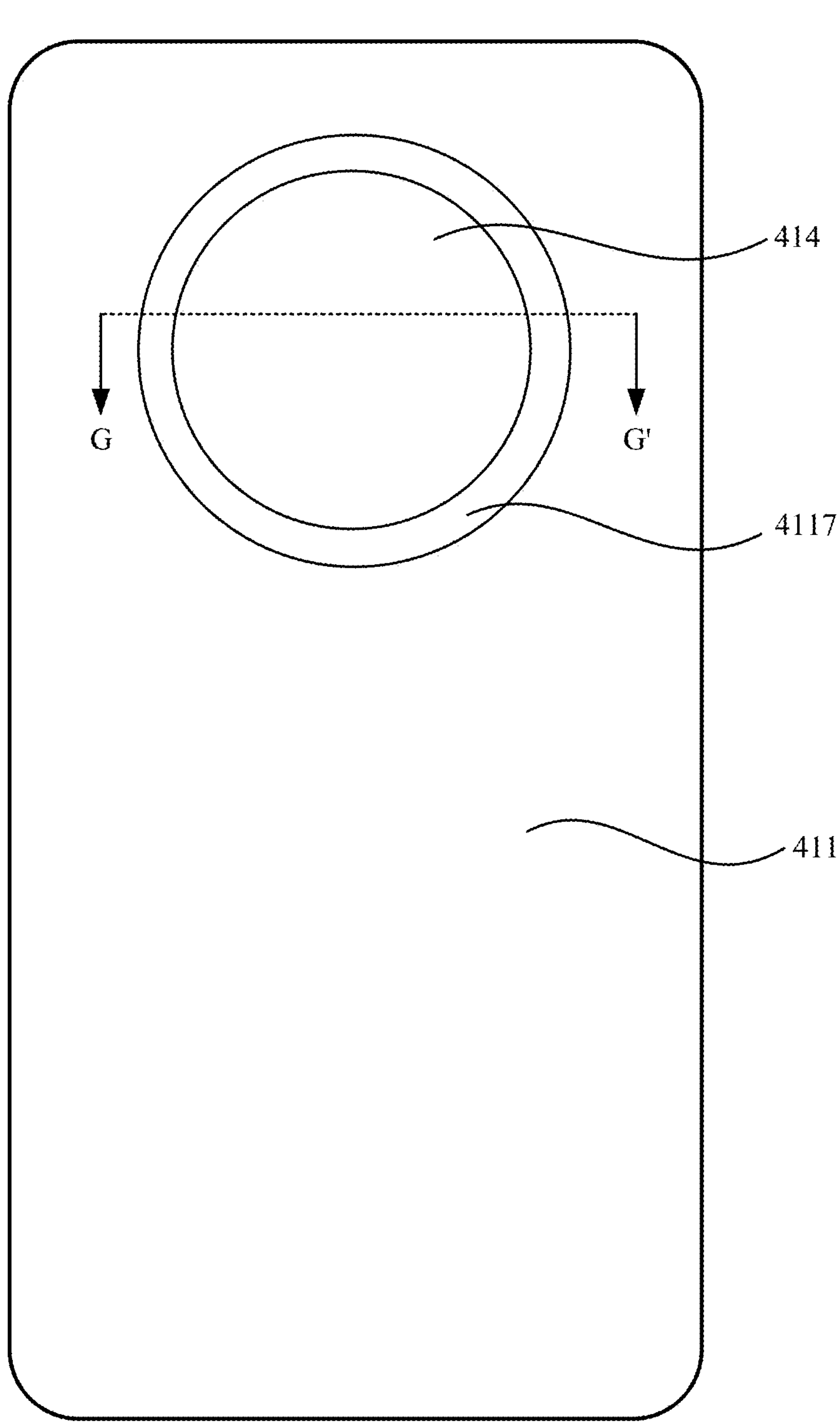
FIG. 23 is a schematic structural diagram of a battery cover according to an embodiment of this application.
Figure 24:
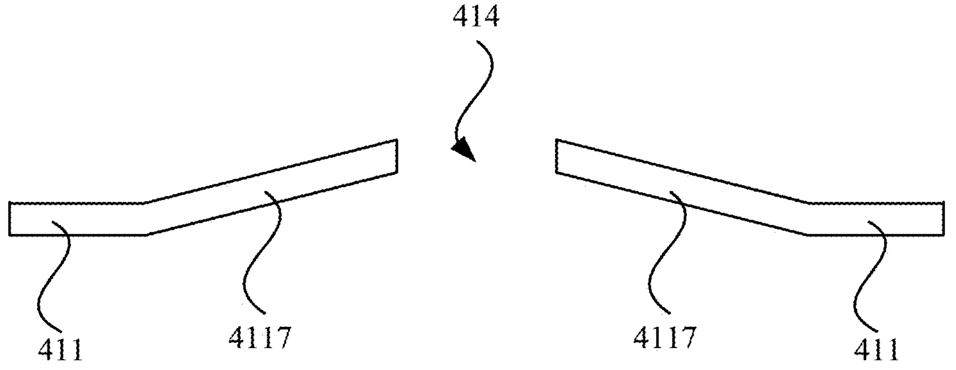
FIG. 24 is a sectional view of the battery cover shown in FIG. 23 in a direction GG' according to an embodiment of this application.

In addition, referring to FIG. 23 and FIG. 24, FIG. 23 is a schematic structural diagram of a battery cover according to an embodiment of this application, and FIG. 24 is a sectional view of the battery cover shown in FIG. 23 in a direction GG' according to an embodiment of this application. The exterior portion 411 further includes a protruding structure 4117 protruding from the external face 4111. The protruding structure 4117 surrounds the decorative hole 41. The protruding structure 4117 includes a crater-shaped structure, which is a trumpet-shaped structure with a narrow top and a wide bottom. Certainly, the crater-shaped structure may alternatively be mounted to the decorative member body 421. The arrangement of the crater-shaped structure further improves the appearance quality of the electronic device.

The foregoing embodiments are merely intended for describing the technical solutions of this application, and are not intended to limit this application. Although this application is described in detail with reference to the foregoing embodiments, it should be understood by a person skilled in the art that, modifications may still be made to the technical solutions described in the foregoing embodiments, or equivalent replacements may be made to the part of the technical features; and these modifications or replacements do not cause the essence of corresponding technical solutions to depart from the scope of the technical solutions in the embodiments of this application.

What is claimed is:

1. An electronic device, comprising:

a middle frame;

a housing assembly, comprising a battery cover, wherein the battery cover is arranged on the middle frame; and a printed circuit board, located between the battery cover and the middle frame, wherein the battery cover supports the printed circuit board; and wherein the battery cover comprises an exterior portion, and the exterior portion comprises an external face and a structural face facing away from the external face; and wherein:

the battery cover further comprises at least one fixing portion, and the at least one fixing portion is located on a side of the structural face facing away from the external face, the at least one fixing portion is correspondingly located with a flexible printed circuit and a connector, and the at least one fixing portion presses the flexible printed circuit and the connector to implement press fit of the connector; or the battery cover further comprises at least one bearing portion, the at least one bearing portion is located on the side of the structural face facing away from the external face, the at least one bearing portion comprises a bearing sub-portion and a connecting sub-portion, the connecting sub-portion is connected between the structural face and the bearing sub-portion, and an extending direction of the connecting sub-portion is different from an extending direction of the bearing sub-portion, in a manner that a bearing groove is formed among the structural face, the bearing sub-portion, and the connecting sub-portion.

2. The electronic device according to claim 1, wherein:

the battery cover comprises the exterior portion and the at least one fixing portion, the at least one fixing portion and the exterior portion are integrally formed, and the structural face partially protrudes to form the at least one fixing portion; or the battery cover comprises the exterior portion and the at least one fixing portion, and the at least one fixing portion and the exterior portion are independently formed.

3. The electronic device according to claim 1, wherein:

the battery cover comprises the exterior portion and the at least one fixing portion, the flexible printed circuit and the connector are located between the battery cover and the middle frame, and the flexible printed circuit is electrically connected to the printed circuit board through the connector; and the at least one fixing portion is in contact with the flexible printed circuit located on the connector.

4. The electronic device according to claim 1, wherein the battery cover comprises the exterior portion and the at least one bearing portion, the electronic device further comprises a functional device, and at least part of the functional device is located in the bearing groove.

5. The electronic device according to claim 4, wherein the functional device comprises a flash light or a near field communication coil.

6. The electronic device according to claim 1, further comprising at least one fixing structure configured to fix the battery cover and the printed circuit board.

7. The electronic device according to claim 6, wherein the at least one fixing structure comprises a screw, and the screw comprises a screw cap and a rod portion;

a threaded hole is arranged on the battery cover; and the rod portion of the screw extends through the threaded hole on the battery cover to fix the battery cover to the printed circuit board.

8. The electronic device according to claim 7, wherein each of the battery cover, the printed circuit board, and the middle frame is provided with threaded holes, the rod portion of the screw extends through the threaded holes arranged on the battery cover, the printed circuit board, and the middle frame to fix the battery cover to the printed circuit board and fix the printed circuit board to the middle frame.

9. The electronic device according to claim 7, wherein each of the exterior portion, the printed circuit board, and the middle frame is provided with threaded holes, a nut is attached to a surface of the printed circuit board, and the rod portion of the screw extends through the threaded hole on the exterior portion to be connected to the nut on the printed circuit board, to fix the battery cover to the printed circuit board.

10. The electronic device according to claim 7, wherein the exterior portion further comprises at least one first groove, the exterior portion is partially recessed from the external face in a direction from the external face toward the structural face to form the at least one first groove, and the at least one first groove is in communication with the threaded hole on the exterior portion; and the screw cap of the screw is located in the at least one first groove.

11. The electronic device according to claim 10, wherein the exterior portion further comprises a second groove, and the exterior portion is partially recessed from the external face in the direction from the external face toward the structural face to form the second groove;

the second groove has a larger size than the at least one first groove, and is in communication with the at least one first groove; and the housing assembly further comprises a shielding layer, and the shielding layer is arranged in the second groove and covers the screw.

12. The electronic device according to claim 11, wherein the shielding layer comprises a lens, a PU leather, ceramic, or plastic.

13. The electronic device according to claim 11, wherein a plurality of first grooves and a plurality of second grooves are arranged, the plurality of second grooves are in communication with each other to form an annular groove, and shielding layers inside the plurality of second grooves are a single-piece structure to form an annular shielding layer.

14. The electronic device according to claim 11, wherein the exterior portion further comprises at least one third groove, and the exterior portion is partially recessed from the external face in the direction from the external face toward the structural face to form the at least one third groove, and the at least one third groove is provided with the shielding layer; and a center of the shielding layer located in the at least one third groove and a center of the shielding layer located in the second groove are arranged in an annular shape.

15. The electronic device according to claim 6, wherein:

the battery cover comprises the exterior portion and the at least one fixing portion, the exterior portion comprises the external face and the structural face facing away from the external face, the at least one fixing portion is located on the side of the structural face facing away from the external face, and the at least one fixing structure is adjacent to the at least one fixing portion; and/or the battery cover comprises the exterior portion and the at least one bearing portion, the exterior portion comprises the external face and the structural face facing away from the external face, the at least one bearing portion is located on the side of the structural face facing away from the external face, and the at least one fixing structure is adjacent to the at least one bearing portion.

16. The electronic device according to claim 6, wherein a position corresponding to an edge of the printed circuit board is provided with the at least one fixing structure.

17. The electronic device according to claim 1, wherein the housing assembly further comprises a decorative member;

the decorative member comprises a decorative member body and a skirt edge; and the decorative member body, the skirt edge, and the battery cover are integrally formed.

18. An electronic device, comprising:

a middle frame;

a housing assembly, comprising a battery cover, wherein the battery cover is arranged on the middle frame; and a printed circuit board, located between the battery cover and the middle frame, wherein the battery cover supports the printed circuit board; and wherein:

the battery cover comprises an exterior portion, and the exterior portion comprises an external face and a structural face facing away from the external face;

the battery cover further comprises at least one fixing portion, and the at least one fixing portion is located on a side of the structural face facing away from the external face; and the battery cover further comprises at least one bearing portion, the at least one bearing portion is located on the side of the structural face facing away from the external face, the at least one bearing portion comprises a bearing sub-portion and a connecting sub-portion, the connecting sub-portion is connected between the structural face and the bearing sub-portion, and an extending direction of the connecting sub-portion is different from an extending direction of the bearing sub-portion, in a manner that a bearing groove is formed among the structural face, the bearing sub-portion, and the connecting sub-portion.

19. The electronic device according to claim 18, further comprising at least one fixing structure configured to fix the battery cover and the printed circuit board.

20. The electronic device according to claim 19, wherein the at least one fixing structure comprises a screw, and the screw comprises a screw cap and a rod portion;

a threaded hole is arranged on the battery cover; and the rod portion of the screw extends through the threaded hole on the battery cover to fix the battery cover to the printed circuit board.

* * * * *